US008463447B2

(12) United States Patent
Newman et al.

(10) Patent No.: US 8,463,447 B2
(45) Date of Patent: Jun. 11, 2013

(54) SYSTEMS AND METHODS FOR MONITORING AND CONTROLLING THE DISPENSE OF A PLURALITY OF PRODUCT FORMING INGREDIENTS

(75) Inventors: David Roy Newman, Atlanta, GA (US); Paul Anderson Phillips, Marietta, GA (US)

(73) Assignee: The Coca-Cola Company, Atlanta, GA (US)

( * ) Notice: Subject to any disclaimer, the term of this patent is extended or adjusted under 35 U.S.C. 154(b) by 947 days.

(21) Appl. No.: 12/204,359

(22) Filed: Sep. 4, 2008

(65) Prior Publication Data

US 2009/0069934 A1 Mar. 12, 2009

Related U.S. Application Data

(60) Provisional application No. 60/970,486, filed on Sep. 6, 2007.

(51) Int. Cl.

| | |
|---|---|
| ***G05D 7/00*** | (2006.01) |
| ***B67B 7/00*** | (2006.01) |
| ***B67D 1/00*** | (2006.01) |
| ***B67D 7/74*** | (2010.01) |

(52) U.S. Cl.
USPC .......... 700/283; 700/239; 700/241; 700/244; 222/1; 222/52; 222/71; 222/129.4

(58) Field of Classification Search
USPC .................. 700/3, 9, 20, 236, 239, 241, 242, 700/244, 283; 222/1, 23, 52, 56, 59, 66, 71, 222/129.4
See application file for complete search history.

(56) References Cited

U.S. PATENT DOCUMENTS

| | | | | |
|---|---|---|---|---|
| 4,509,863 | A * | 4/1985 | Borrow | 366/152.1 |
| 4,517,651 | A | 5/1985 | Kawasaki et al. | |
| 4,563,739 | A | 1/1986 | Gerpheide et al. | |
| 4,819,176 | A | 4/1989 | Ahmed et al. | |
| 4,890,774 | A * | 1/1990 | Poore | 222/640 |
| 5,147,068 | A | 9/1992 | Wright | |
| 5,225,819 | A | 7/1993 | Hosotani et al. | |

(Continued)

FOREIGN PATENT DOCUMENTS

| | | | |
|---|---|---|---|
| DE | 19627360 | A1 | 1/1998 |
| EP | 1626375 | A1 | 2/2006 |
| GB | 2416757 | A | 9/2004 |
| WO | 2007070032 | A1 | 6/2007 |

OTHER PUBLICATIONS

Partial Search Report of PCT/US2008/075177.
Disclosure Under 37 C.F.R. §1.56 as filed Dec. 22, 2008.

*Primary Examiner* — Sean Shechtman
(74) *Attorney, Agent, or Firm* — Sutherland Asbill & Brennan LLP

(57) ABSTRACT

Systems and methods for dispensing a product are provided. A plurality of product ingredients are associated with a product dispenser that is operable to form a plurality of selectable products from the plurality of products ingredients. Input for a selected product is received and a recipe that defines the ratio of product ingredients for forming the selected product is identified. The dispense of each of the respective product ingredients is commenced based at least in part on the identified recipe, and the dispense of each of the respective product ingredients is independently monitored during the dispense of the selected product.

24 Claims, 9 Drawing Sheets

U.S. PATENT DOCUMENTS 5,312,017 A 5/1994 Schroeder et al.
5,358,145 A 10/1994 Smith et al.
5,603,430 A 2/1997 Loehrke et al.
5,615,801 A 4/1997 Schroeder et al.
5,691,684 A 11/1997 Murrah
5,731,981 A 3/1998 Simard
5,735,436 A 4/1998 Schroeder et al.
5,798,694 A 8/1998 Reber et al.
5,842,603 A 12/1998 Schroeder et al.
6,119,434 A 9/2000 Andersson
6,131,399 A 10/2000 Hall
6,238,721 B1 5/2001 Knepler
6,354,468 B1 3/2002 Riek
6,375,043 B1 4/2002 LeBlanc
6,378,275 B1 4/2002 Andersson
6,421,583 B1 * 7/2002 Sudolcan et al. ............. 700/239
6,424,884 B1 7/2002 Brooke et al.
6,465,035 B1 10/2002 Knepler
6,479,086 B1 11/2002 Knepler
6,564,999 B1 5/2003 Saveliev et al.
6,572,016 B2 6/2003 Saveliev et al.
6,698,228 B2 3/2004 Kateman et al.
6,751,525 B1 6/2004 Crisp
6,756,069 B2 6/2004 Scoville et al.
6,772,944 B2 8/2004 Brown
6,799,085 B1 9/2004 Crisp
6,807,460 B2 10/2004 Black et al.
6,907,741 B2 6/2005 Kateman
6,918,258 B2 7/2005 Cunha et al.
6,941,858 B2 9/2005 Kateman
6,968,876 B2 11/2005 Yacko et al.
6,980,887 B2 12/2005 Varga et al.
6,982,640 B2 1/2006 Lindsay et al.
6,990,391 B1 1/2006 Cunha et al.
7,009,519 B2 3/2006 Leonard et al.
7,020,680 B2 3/2006 Defosse
7,028,861 B2 4/2006 Sayers et al.
7,031,804 B2 4/2006 Brooke et al.
7,032,818 B2 4/2006 Thomas
7,053,773 B2 5/2006 McGarry et al.
7,082,970 B2 8/2006 Bartholomew et al.
7,147,131 B2 12/2006 Sher et al.
7,156,259 B2 1/2007 Bethuy et al.
7,223,427 B2 5/2007 Knepler
7,284,576 B1 * 10/2007 Yacko et al. .................... 141/95
7,331,483 B2 2/2008 Bhimani et al.
7,387,239 B2 6/2008 Thomas et al.
7,391,318 B2 6/2008 Higashi
7,640,755 B1 1/2010 Kateman
8,181,822 B2 * 5/2012 Doelman et al. .................. 222/1
2002/0014496 A1 * 2/2002 Cline et al. ........................ 222/1
2002/0059175 A1 5/2002 Nakano
2002/0161653 A1 10/2002 Walker et al.
2002/0183893 A1 12/2002 Brooke et al.
2003/0010791 A1 1/2003 Gentiluomo et al.
2003/0129286 A1 7/2003 Knepler
2004/0103033 A1 5/2004 Reade et al.
2004/0113786 A1 6/2004 Maloney
2004/0129720 A1 7/2004 Cheng et al.
2004/0226994 A1 11/2004 Brown
2004/0243259 A1 12/2004 Peterson et al.
2005/0035152 A1 * 2/2005 Bethuy et al. .............. 222/129.2
2005/0075900 A1 4/2005 Arguimbau
2005/0143857 A1 6/2005 Chirnomas
2005/0167493 A1 8/2005 Barton et al.
2005/0178793 A1 8/2005 Cheng et al.
2005/0258961 A1 11/2005 Kimball et al.
2005/0276883 A1 12/2005 Jeffrey et al.
2006/0000851 A1 1/2006 Girard et al.
2006/0043101 A1 3/2006 Bhimani et al.
2006/0051614 A1 3/2006 Su et al.
2006/0054614 A1 3/2006 Baxter et al.
2006/0081653 A1 4/2006 Boland et al.
2006/0102645 A1 5/2006 Walker et al.
2006/0108415 A1 5/2006 Thomas et al.
2006/0115570 A1 6/2006 Guerrero et al.
2006/0115572 A1 6/2006 Guerrero et al.
2006/0131329 A1 6/2006 Sayers et al.
2006/0144244 A1 7/2006 Girard et al.
2006/0192003 A1 8/2006 Chung
2006/0261156 A1 11/2006 Brown
2007/0016852 A1 1/2007 Kim et al.
2007/0044820 A1 3/2007 Chan et al.
2007/0252709 A1 11/2007 Collins et al.
2008/0029541 A1 2/2008 Wallace et al.
2008/0116262 A1 5/2008 Majer
2008/0173705 A1 7/2008 Girard et al.

* cited by examiner

SYSTEMS AND METHODS FOR MONITORING AND CONTROLLING THE DISPENSE OF A PLURALITY OF PRODUCT FORMING INGREDIENTS

RELATED APPLICATION

This application claims priority to U.S. Provisional Ser. No. 60/970,486, entitled "Systems and Methods for Monitoring and Controlling the Dispense of a Plurality of Beverage Ingredients," filed on Sep. 6, 2007, the contents of which are incorporated by reference.

TRADEMARKS

COCA-COLA® is a registered trademark of The Coca-Cola Company, Atlanta, Ga., U.S.A. Other names, symbols, designs, or logos used herein may be registered trademarks, trademarks or product names of The Coca-Cola Company or other companies.

TECHNICAL FIELD OF THE INVENTION

This invention relates to product dispensers, and in particular, relates to systems and methods for providing individually monitoring and controlling the dispense of a plurality of product forming ingredients.

BACKGROUND OF THE INVENTION

Conventional beverage dispensers can pour a beverage by combining a syrup, sweetener, and/or water. These conventional beverage dispensers generally offer a finite variety of beverage selections that incorporate different kinds of syrups. The offered beverage selections can include branded and non-branded beverage selections. As an example, a single conventional dispenser using several different kinds of syrup might be able to offer choices of COCA-COLA™, DIET COCA-COLA™, SPRITE™, and a few other branded or non-branded beverage selections.

In order to dispense a particular beverage, conventional beverage dispenses typically actuate one or more solenoids, switches and/or valves associated with the various ingredients of the beverage. The associated solenoids, switches and/or valves for each ingredient are typically actuated for a predetermined period of timer, thereby causing a predetermined amount of ingredients to be dispensed for the selected beverage.

One problem with these types of conventional beverage dispensers is that the dispense quality of a selected beverage can be lowered or degraded if one or more of the ingredients for the selected beverage are not being dispensed properly. For example, a conventional dispenser may dispense a low quality COCA-COLA™ beverage if the COCA-COLA™ syrup is not being dispensed properly and/or if the source for the COCA-COLA™ syrup is empty or approximately empty. Additionally, it can be difficult for a customer or user of the dispenser to identify the low quality beverage. Furthermore, as more and more ingredients are combined to form or dispense a selected beverage, it can be difficult for a customer to identify the one or more ingredients that are not dispensed properly and, therefore, are contributing to the lower beverage quality.

Accordingly, there is a need for improved systems and methods for monitoring and control the dispense of a plurality of product forming ingredients.

SUMMARY OF THE INVENTION

Some or all of the above needs and/or problems may be addressed by embodiments of the invention. Embodiments of the invention may include systems and methods for independently monitoring and controlling the dispense of a plurality of product ingredients utilized to form a selected product. In one embodiment, a method for dispensing a product, such as, a beverage, is provided. A plurality of product ingredients may be associated with a product dispenser. A plurality of selectable products may be formed utilizing the plurality of product ingredients. Input for a selected product may be received. A recipe for the selected product that defines the ratio of the product ingredients for forming the selected product may be identified. A dispense for each of the respective product ingredients for the selected beverage may be commenced based at least in part on the identified recipe. The dispense of each of the respective product ingredients may be independently monitored for the selected beverage.

Another embodiment may provide a method for dispensing a product ingredient. Input for a selection of a product for dispense may be received. The product ingredient may be a component or ingredient of the selected product. A recipe for the selected product that defines a ratio of the product ingredient relative to one or more other product ingredients for the selected product may be identified. A dispense of the product ingredient may be commenced based at least in part on the identified recipe. The dispense of the product ingredient may be monitored.

Yet another embodiment may provide a dispenser apparatus. The dispenser apparatus may include an ingredient matrix operable to receive a plurality of ingredient packages within respective locations. A plurality of selectable products may be formed from at least some of the plurality of product ingredients. The dispenser apparatus may further include an input device operable to receive a product selection. The dispenser apparatus may further include a controller to execute a set of instructions operable to receive the product selection and identify a recipe for the selected product. The recipe may define a ratio of product ingredients to form the selected product. The controller may execute a set of instructions operable to direct a dispense of each of the respective product ingredients based at least in part on the identified recipe and independently monitor the dispense of each of the respective product ingredients.

In yet another embodiment, a dispenser apparatus may be provided. The dispenser apparatus may include an ingredient matrix operable to receive a plurality of ingredient packages within respective locations, and a plurality of selectable products may be formed from at least some of the plurality of product ingredients. The dispenser apparatus may further include an input device operable to receive a product selection and a controller to execute a set of instructions operable to receive the product selection, identify a recipe for the selected product that defines a ratio of product ingredients to form the selected product, and direct a dispense of each of the respective product ingredients based at least in part on the identified recipe. The dispenser apparatus may further include one or more control nodes respectively associated with each of the product ingredients. Each of the one or more control nodes may execute a set of instructions operable to receive, from the controller, a dispense direction and at least one associated dispense parameter that is based at least in part on the identified recipe, to commence the dispense of an associated product ingredient based at least in part on the at least one associated dispense parameter, and to monitor the dispense of the associated product ingredient.

Additional systems, methods, dispensers, features and advantages are realized through the techniques of various embodiments of the invention. Other embodiments and aspects of the invention are described in detail herein and are considered a part of the claimed invention. Other advantages and features can be understood with reference to the description and to the drawings.

BRIEF DESCRIPTION OF THE FIGURES

Reference will now be made to the accompanying drawings, which are not necessarily drawn to scale, and wherein.

The detailed description explains various embodiments of the invention, together with advantages and features, by way of example with reference to the drawings.

DETAILED DESCRIPTION OF EMBODIMENTS OF THE INVENTION

As used herein, the terms "beverage forming dispenser", "product dispenser", "beverage dispenser", "dispenser apparatus", and "dispenser" refer to a device which dispenses a product such as a beverage, can, bottle, or container.

As used herein, the terms "product" and "beverage", and their pluralized forms, are used synonymously, and embodiments of the invention should not be limited in scope by the use of either term.

Illustrative embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Figure 1:
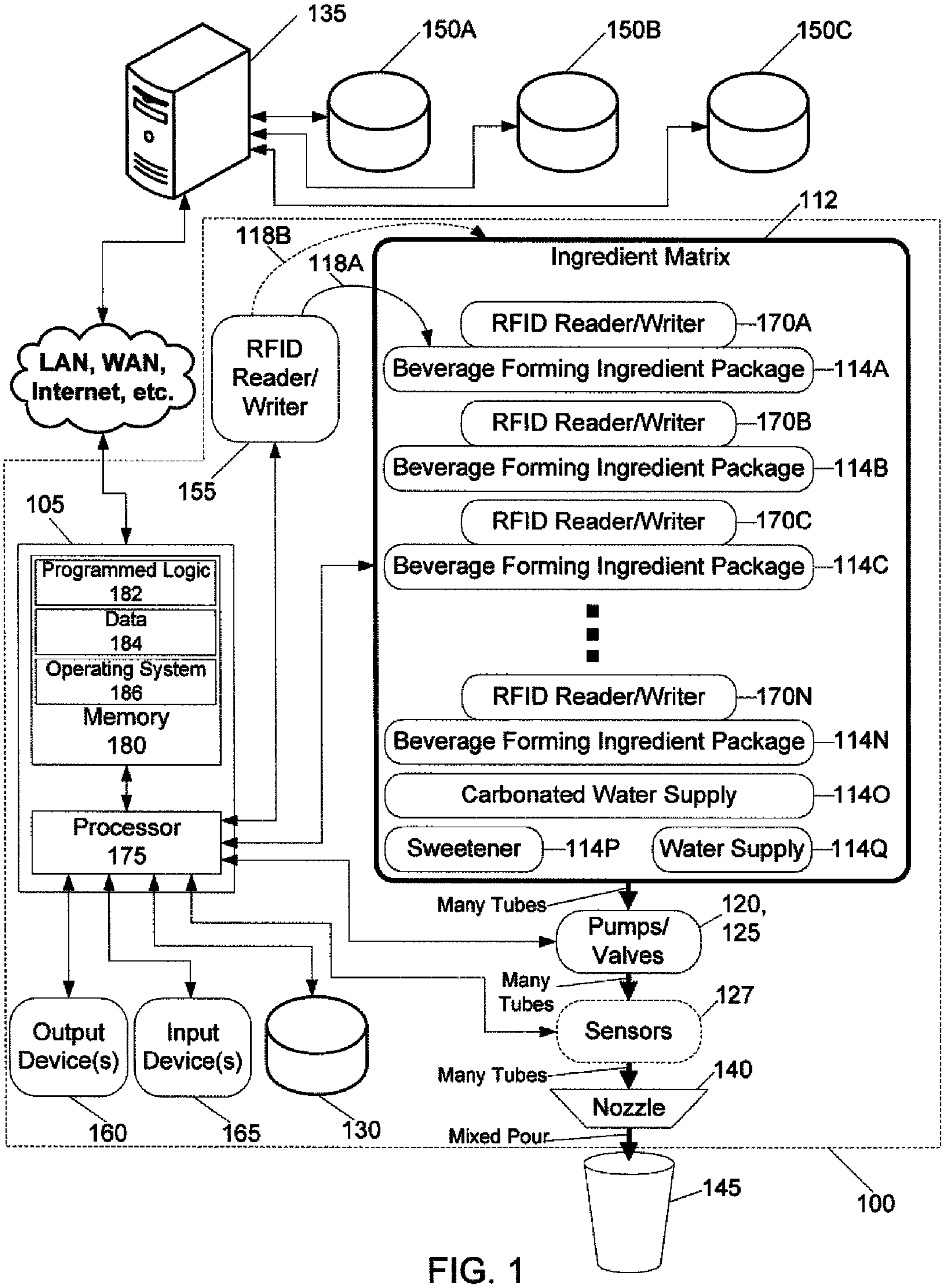
FIG. 1 illustrates one example of a beverage forming dispenser in accordance with an embodiment of the invention.

Turning now to the drawings in greater detail, it will be seen that in FIG. 1 there is one example of a beverage forming dispenser 100, beverage dispenser, or dispenser apparatus that may be utilized in accordance with embodiments of the invention. The example beverage forming dispenser 100 may include a controller 105 operationally related to an ingredient matrix 112. A plurality of beverage forming ingredient sources may be connected to the ingredient matrix 112. Suitable beverage forming ingredient sources may include, for example, beverage forming ingredient packages that are inserted into the ingredient matrix 112 and/or beverage forming ingredient sources that are remotely situated relative to the beverage forming dispenser 100 and connected to the ingredient matrix 112 via suitable supply lines. For example, beverage forming ingredient sources may be supplied to the beverage forming dispenser 100 via a bag-in-box (BIB) system.

In one embodiment, a plurality of beverage forming ingredient packages may be inserted into the ingredient matrix 112. The ingredient matrix may secure each of the plurality of beverage forming ingredient packages, such as 114A-114Q. In addition, the ingredient matrix 112 may be operationally related to a controller, such as controller 105, and to a plurality of pumps 120 and/or valves 125. In this regard, under control of the controller 105, the plurality of pumps 120 and/or valves 125 may be operated to effectuate the precise pumping of beverage forming products from certain of the plurality of beverage forming ingredient packages 114A-114Q to dispense a custom beverage. A plurality of sensors 127 may optionally monitor and measure the amount of beverage forming products that are pumped from certain of the plurality of beverage forming ingredient packages 114A-114Q.

In one embodiment, the ingredient matrix 112 may have dozens of different types and kinds of beverage forming ingredient packages, such as 114A-114Q, inserted into it. In operation, each of the beverage forming ingredient packages 114A-114Q may be selectively combined per a recipe in varying ratios to form thousands of different kinds of beverages.

For example and not as a limitation, a customer, consumer, or user may make a beverage type selection at a suitable input device 165 associated with the controller, such as a user interface. A recipe to form the selected beverage including ingredients and ratio of ingredients may be obtained by the controller 105 from a database local to the controller 105, such as database 130, from memory associated with the controller 105, such as memory 180, and/or from a remote data processing resource, such as data processing resource 135 which may be a server. The controller 105 may operate any certain of the plurality of pumps 120 and/or valves 125 to form and dispense a beverage by way of a nozzle 140 into a cup 145.

Beverage forming dispensers in accordance with embodiments of the invention, such as beverage forming dispenser 100, may store or be associated with any number of ingredients, for example, lime flavoring, vanilla flavoring, cherry flavoring, and various ingredient parts of many branded and non-branded drinks. An advantage is that, for example and not as a limitation, a COCA-COLA™ beverage can be poured, or by adding cherry flavoring a CHERRY COCA-COLA™ beverage can be poured, or by adding vanilla flavoring and changing the formula a DIET VANILLA COCA- COLA™ beverage can be poured. In one embodiment, by having a controller 105 operationally related to a plurality of beverage forming ingredient packages 114 and a plurality of pumps 120 and valves 125, a consumer can form and pour thousands of different kinds of beverages by adding flavoring, and/or combining and varying ingredients and ingredient ratios.

With continued reference to FIG. 1, according to some embodiments of the invention, the controller 105 may be operationally related to a database 130 that includes beverage recipes, formulations, and methods of making beverages. Such beverage recipes, formulations, and methods of making beverages may include an ingredient list, the ratio of each ingredient, a listing of how a beverage can be customized by a consumer, consumer preferences for dispensing one or more beverages, portion control dispense information associated with one or more beverages and/or other types and kinds of beverage recipes, formulations, and methods of making a beverage as may be required and/or desired by a particular embodiment. The controller 105 may be operable to execute a set of instructions to form one or more beverages from one or more of the beverage forming ingredient packages for dispensing to a consumer. Also illustrated in FIG. 1 is a nozzle 145. The nozzle 145 may combine the flows from the plurality of pumps 120 and/or valves 125 to mix and dispense the beverage into a cup, such as cup 145. The mixing of the beverage may occur prior to, during, and/or following the dispense of the flows from the nozzle 145.

With regards to the ingredient matrix 112, there is illustrated in FIG. 1 how a plurality of beverage forming ingredient packages, such as 114A-114Q, may be physically inserted into respective locations within the ingredient matrix 112, secured, and associated with a unique pump, valve, and/or a unique combination of pump(s) and/or valve(s). Then in operation, by way of pumps 120 and valves 125, as required by a recipe, select beverage forming ingredient packages, such as 114A-114Q, can be pumped in precise amounts or ratios to form branded beverages such as CHERRY COCA-COLA™, VANILLA COCA-COLA™, COCA-COLA™, DIET COCA-COLA™, and FANTA™ beverages, as well as a vast range of other branded beverages, non-branded beverages, and/or consumer customized beverages. A beverage forming dispenser in accordance with embodiments of the invention, such as beverage forming dispenser 100, may dispense a vast range of beverage types, including but not limited to, carbonated beverages, non-carbonated beverages, diet beverages, teas, coffees, vitamin beverages, energy drinks, sports drinks, and/or dairy products.

For purposes of disclosure, beverage forming packages, such as 114A-114Q, may be collectively or generally referred to as beverage forming ingredient package 114. Each beverage forming ingredient package 114 may be manufactured as a pouch of liquid secured in a plastic ridged container to allow insertion into the ingredient matrix 112. When inserted into the ingredient matrix 112, the pouch may be pierced by at least one fitting or other suitable piercing device, allowing the liquid in the pouch to be pumped or otherwise metered by pumps 120 and/or valves 125 in precise ratios to form the desired beverage. Additionally, one or more sensors, such as sensors 127, may monitor the amount or volume of liquid that is pumped from a beverage forming ingredient package 114. One or more sensors 127 may also be utilized to aid in the detection of a beverage forming ingredient package 114 that is approximately empty and/or not flowing properly. For example, a capacitive sensor may be situated between a beverage forming ingredient package 114 and an associated pump 120. The capacitive sensor may detect each time that liquid is drawn into the pump 120. As an example, the capacitive sensor may detect the flexing of a metal strip each time that liquid is drawn into the pump 120. If no flex is detected by the capacitive sensor, then a determination may be made by a controller in communication with the capacitive sensor, such as controller 105 or node controller 310A shown in FIG. 3, that the beverage forming ingredient package 114 is approximately empty and/or malfunctioning. If a flex is detected, then a determination may be made by a controller in communication with the capacitive sensor that the beverage forming ingredient package 114 is functioning properly and contains a sufficient amount of liquid to complete the pumping and dispense of a beverage.

In some instances, other ingredients, components, or beverage forming additives may be inserted or otherwise operatively connected with the ingredient matrix 112. For instance, a carbonated water supply 114O, a sweetener 114P, and a water supply 114Q may be operatively connected with the ingredient matrix 112. These ingredients, components, or beverage forming additives may be in the form of a pouch, or may be in another configuration suitable for access by the ingredient matrix 112. For example, one or more of these ingredients, components, or beverage forming additives may be supplied to the ingredient matrix 112 via suitable input tubing from respective beverage forming ingredient sources.

In the examples of the carbonated water supply 114O and the water supply 114Q, a continuous supply of liquid like carbonated water, water and/or other continuous ingredient supplies can be provided by a combination of pumps 120, valves 125, and/or variable orifice regulators to meter and/or control the flow of liquid, carbonated water, water, or other ingredient supplies during the formation of the beverage. In a continuous supply example, the carbonated water supply 114O and the water supply 114Q may be connected to the ingredient matrix 112. Additionally, in accordance with some embodiments of the invention, one or more beverage forming ingredients may be circulated through a prechiller (not shown) before being supplied to the ingredient matrix 112. For example, carbonated water and water may be respectively supplied from the carbonated water supply 114O and the water supply 114Q and circulated through one or more prechillers prior to being supplied to the ingredient matrix 112. Additionally or alternatively, one or more beverage forming ingredients may be supplied from refrigerated sources.

In one example, sweetener 114P may be a non-nutritive sweetener (NNS), high fructose corn syrup (HFCS), or other types or kinds of sweetener as may be required and/or desired in a particular embodiment. In this example, the sweetener 114P can be a pouch capable of being connected to the ingredient matrix 112. Additionally, in some embodiments, a plurality of sweeteners may be supplied to the ingredient matrix 112.

In one embodiment, some of the beverage forming ingredients 114 referred to as pungent may be limited to selected ingredient matrix 112 locations. In this regard, pungent ingredients are so strong that once a pungent ingredient is drawn through dispenser tubing in the beverage forming dispenser the tubing is permanently flavored and any fluids that pass through the tubing will be tainted with the pungent taste. As such, once a pungent ingredient is used in the matrix, it may be desirable to limit the replacement and/or addition of other pungent ingredients to certain of the ingredient matrix locations to maintain a premium quality beverage.

Also in one embodiment, certain of the beverage forming ingredient packages 114 may require agitation to keep the ingredient mixed. In these cases, the location of such ingredients in the ingredient matrix 112 may be limited to ingredient matrix locations that can be agitated as may be required and/or desired in a particular embodiment.

Additionally, one or more continuous ingredient supplies may be connected to the ingredient matrix 112 in respective locations in which the continuous ingredient supplies may be agitated. For example, a continuous supply of ice may be connected to the ingredient matrix 112, and ice may be agitated prior to, during, and/or after the dispense of a beverage.

Also in one embodiment, certain of the beverage forming ingredient packages 114 may require antimicrobial tubing and/or dispenser parts. These beverage forming ingredient packages 114 may include milk, dairy, soy, and/or other types and kinds of beverage forming ingredient packages. In these cases, the location of such ingredients in the ingredient matrix 112 may be limited to ingredient matrix locations that utilize the appropriate antimicrobial tubing and/or dispenser parts as may be required and/or desired in a particular embodiment.

In one embodiment, for the most part, there may be a relationship between a particular beverage forming ingredient package 114 and one or more respective pumps 120 and/or valves 125. For example, there may be a one-to-one relationship between a particular beverage forming ingredient package 114 and a pump 120 and/or valve 125. As another example, there may be a four-to-one relationship between a particular beverage forming ingredient package 114 and associated pumps 120 and/or valves 125. A wide variety of relationships between a particular beverage forming ingredient package 114 and associated pump(s) and/or valve(s) may be utilized as desired in various embodiments of the invention. The utilization of more than one pump 120 and/or valve 125 may facilitate the ability to draw a higher volume of a beverage ingredient from a beverage forming ingredient package 114 in a shorter period of time. In a few cases, it may be desirable to utilize a plurality of pumps and/or valves on a single ingredient to be able to draw a higher volume of liquid from the package in a shorter period of time. One such ingredient in which it may be desirable to use a plurality of pumps 120 and/or valves 125 to be able to draw a higher volume of liquid from the package 114 in a shorter period of time can be the sweetener 114P.

With continued reference to FIG. 1, a controller associated with a beverage forming dispenser 100, such as controller 105, may be any suitable controller, computing device, or plurality of devices, for example, a microcontroller, minicomputer, personal computer, etc. The controller 105 may include a processor 175 and a memory 180. The memory 180 may store programmed logic 182 (e.g., software) in accordance with embodiments of the invention. One example of software or a computer-readable medium may be program code or a set of instructions operable to control the operation of a beverage forming dispenser, such as beverage forming dispenser 100. In certain embodiments of the invention, the memory 180 may also include data 184 utilized in the operation of the beverage forming dispenser 100. The data 184 may include data that is manually input into the controller 105, data that is communicated to the controller 105, data associated with and/or received from other components of the beverage forming dispenser 100, data received from customers or users of the beverage forming dispenser 100, and/or data received from a remote source, such as data processing resource 135. In certain embodiments of the invention, the memory 180 may also include an operating system 186. The processor 175 may utilize the operating system 186 to execute the programmed logic 182, and in doing so, may also utilize at least a portion of the data 184.

The controller 105 may receive input or data from other components of the beverage forming dispenser 100, from remote devices, such as data processing resource 135, and/or from a customer or user via one or more suitable input devices 165. The one or more suitable input devices may include touch pads, touch screens, interactive displays, selection elements, switches, buttons, keyboards, keypads, control panels, disk drives, CD-ROMS, DVDs, removable memory devices, and/or any other device capable of communicating data to the controller 105. The controller 105 may also output data or control the output of data to other components of the beverage forming dispenser 100, to one or more remote devices, and/or to one or more suitable output devices 160. The one or more suitable output devices may include displays, interactive displays, printers, etc.

With continued reference to FIG. 1, a controller associated with a beverage forming dispenser 100, such as controller 105, may be related to or connected to one or more servers or data processing resources, such as data processing resource 135, via a suitable network connection. In one embodiment, a beverage forming dispenser 100 may be networked via a network connection to the data processing resource 135, such as a server. Such a network connection may be facilitated by any appropriate network, for example, the Internet, a local area network (LAN), a wide area network (WAN), a LON WORKS network, and/or other types and kinds of networks or network connections as may be required and/or desired by a particular embodiment.

The data processing resource 135, such as a server, may be in communication with a plurality of databases such as recipes, formulations, and methods of making beverages database 150A, operational database 150B, and/or consumer database 150C. In addition, the data processing resource 135 may be used to aid or facilitate recipes, formulations, methods of making beverages, provide operational data processing, perform data processing related to consumer interaction, and/or perform other data processing as may be required and or desired in a particular embodiment. Such operational data processing may include, for example and not as a limitation, equipment status, maintenance, service alerts, predictive restock, and/or other types and kinds of operational data processing as may be required and/or desired in a particular embodiment. Such consumer interaction support may include, for example and not as a limitation, consumer preferences, consumer beverage preferences, loyalty, gaming, prizes, media content, customizations, and/or other types and kinds of consumer interaction and/or data processing support as may be required and/or desired by a particular embodiment. In certain embodiments, one or more of the databases associated with the data processing resource 135, such as databases 150A, 150B, and 150C, may be associated with the beverage forming dispenser 100 via a network connection. Accordingly, any of the information that is maintained by the one or more databases may be accessed by a controller associated with the beverage forming dispenser 100, such as controller 105, and/or stored in one or more other databases associated with the controller, such as database 130. For purposes of disclosure, databases 130, 150A, 150B, and 150C are collectively or otherwise individually referred to herein as database 130.

With continued reference to FIG. 1, a beverage forming dispenser in accordance with some embodiments of the invention, such as beverage forming dispenser 100, may include or be associated with one or more machine readable code readers 155. Each of the one or more machine readable code readers 155 may be any suitable type of reader or group of readers, for example, a bar code, RID, reflected light frequency, optical, etc. In one embodiment, a machine readable code reader 155 may be utilized to scan or read the beverage forming ingredient packages 114A-114Q prior to insertion into the ingredient matrix 112. In this regard, the controller 105 may be used to obtain information related to or associated with the beverage forming ingredient package, such as 114A, using information from the scan or read, and use such information to identify within the ingredient matrix 112 an optimum matrix location for placement of the beverage forming ingredient package. For example, data from a beverage forming ingredient package 114A, such as a serial number or identification code, can be utilized alone or correlated with previously stored information in a database, such as 130, or with data otherwise accessible or stored by data processing resource 135, which may identify one or more ingredients associated with the beverage forming ingredient package 114A. In another example, data from a beverage forming ingredient package 114A, such as an ingredient code or identifier, can be utilized alone or correlated with previously stored information in a database, such as 130, or with data otherwise accessible or stored by data processing resource 135, which may identify one or more ingredients associated with the beverage forming ingredient package 114A.

In addition, as beverage forming ingredient packages 114A-114Q are scanned and an optimum matrix location identified, package installation personnel can be informed where a particular beverage forming ingredient package 114A is to be located in the ingredient matrix 112 by way of one or more suitable output devices 160, such as a light emitting diode (LED) display indicator. The personnel may additionally or alternatively be informed by way of other types and kinds of output devices or display indicators as may be required and/or desired in a particular embodiment. Other embodiments may include output devices such as LCD screens, input/output (I/O) interfaces, and/or audio interfaces. The package installation personnel may additionally be prompted for user input via one or more user options or selections associated with the beverage forming dispenser 100 and/or the particular beverage forming ingredient package 114A. The one or more user options or selections that are utilized to prompt the user may be presented to the user in any suitable form, for example, via the one or more output devices 160. User input or selections may be communicated to the beverage forming dispenser 100 via one or more suitable input devices 165, such as a touchpad associated with a controller of the beverage forming dispenser, such as controller 105. Other embodiments may include input devices such as keypads, interactive displays, push buttons, voice recognition, etc.

In one embodiment, correct beverage forming ingredient package 114 insertion into the ingredient matrix 112 may be double checked or otherwise verified by scanning a machine readable code on the package (illustrated as 118A) and scanning a machine readable code located on the ingredient matrix 112 at the point of insertion (illustrated as 118B). In this regard, the controller 105 may then check or verify that the beverage forming ingredient package 114 is correctly located in the ingredient matrix 112. Additionally or alternatively, a machine readable code reader 170A that is associated with a particular matrix location in the ingredient matrix 112, such as a radio frequency identification (RFID), may be utilized to read an RFID tag (illustrated as 118A) associated with the beverage forming ingredient package 114A prior to, during, and/or subsequent to its insertion into the ingredient matrix 112. In this regard, a controller, such as controller 105 may be used to obtain information related to or associated with the beverage forming ingredient package 114A, and use such information to identify or otherwise determine the location within the ingredient matrix 112 of the beverage forming ingredient package 114A.

A determination may also be made as to whether the beverage forming ingredient package 114A has been inserted into an appropriate location within the ingredient matrix 112. In accordance with one or more embodiments of the invention, a plurality of machine readable code readers may be associated with respective locations within the ingredient matrix 112. As beverage forming ingredient packages 114 are inserted into the ingredient matrix 112 and scanned, package installation personnel may be informed where the beverage forming ingredient package 114 is located in the ingredient matrix 112 by way of one or more suitable output devices 160, such as a light emitting diode (LED) display indicator. The package installation personnel may additionally or alternatively be informed by way of other types and kinds of output devices or display indicators as may be required and/or desired in a particular embodiment. Other embodiments can include output devices such as LCD screens, input/output (I/O) interfaces, and audio interfaces.

The package installation personnel may also be informed via one or more suitable output devices 160 of any determination(s) that a beverage forming ingredient package has been inserted into an incorrect location within the ingredient matrix 112. For example, if an optimal location in the ingredient matrix 112 has been determined for a beverage forming ingredient package, such as 114A, utilizing machine readable code reader 155, then the insertion into the optimal location may be verified by a machine readable code reader associated with the optimal location, such as machine readable code reader 170A. The package installation personnel may be informed of the correct insertion. If the beverage forming ingredient package is inserted into a different location than the optimal location, then a machine readable code reader associated with the different location may be utilized in a determination that the beverage forming ingredient package has not been properly inserted into the optimal location. The package installation personnel may then be notified of the improper insertion. As another example, if a beverage forming ingredient package, such as 114A, is replaced in the ingredient matrix 112 with a new beverage forming ingredient package, a machine readable code reader associated with the location in the ingredient matrix 112 may be utilized in association with a determination that the new beverage forming ingredient package may be inserted into the location. For example, if the location is associated with a cherry syrup, then a determination may be made as to whether the new beverage forming ingredient package is a cherry syrup.

Furthermore, in one embodiment, a RFID tag associated with a beverage forming ingredient package, such as 114A, may be written to and/or modified such that the beverage forming ingredient package 114A is prevented or otherwise limited from being inserted into a second or other beverage forming dispenser. In this regard, should service personnel attempt to read the RFID tag a second time in an attempt to relocate the package 114A into a second beverage forming dispenser it would be known to a controller associated with the second beverage forming dispenser that the package 114A has previously been inserted into a different beverage dispenser, and as such, would not allow the package 114A to be operated in a second ingredient matrix. In operation, this can prevent partially used beverage forming ingredient packages from being transferred between beverage forming dispensers. Similarly, a RFID tag associated with a beverage forming ingredient package, such as 114A, may be written to and/or modified such that the beverage forming ingredient package

114A is prevented or otherwise limited from being inserted into certain locations in the ingredient matrix 112 of a beverage forming dispenser, such as beverage forming dispenser 100.

With continued reference to FIG. 1, a beverage forming dispenser in accordance with certain embodiments of the invention may include a RFID reader/writer, such as 170A, that is associated with each insertion location within the ingredient matrix 112. In this regard, as a beverage forming ingredient package, such as 114A, is inserted into the ingredient matrix 112, a unique RFID reader/writer, such as 170A, can be associated with each respective ingredient matrix 112 insertion location, and can read and/or write to the respective beverage forming ingredient package, such as 114A.

Illustrated in FIG. 1 is an example of how a RFID reader/writer 170A may be located adjacent to an insertion location within an ingredient matrix 112 where a particular beverage forming ingredient package, such as 114A, is to be inserted. As such, a RFID reader/writer 170B may be associated with an insertion location for package 114B, and similarly 170C may be associated with 114C, continuing through the total number 'N' of insertion locations and packages represented as 170N and 114N respectively. In one embodiment, there may be forty four (44) RFID reader/writers 170A-170N associated with beverage forming ingredient packages 114A-114N though not all ingredients such as, for example and not as a limitation, carbonated water 114O, sweetener 114P, and water 114Q, may have respective RFID reader/writers. For purposes of disclosure, a RFID reader/writer 170A-170N may be referred to as RFID reader/writer 170 or RFID reader 170, and 'N' may represent the total number of objects such as packages 114N or RFID readers/writers 170N. In one embodiment 'N' may be any number, and in another embodiment, 'N' may be a number less than or in excess of forty four (44).

In one embodiment, a RFID reader 170 may be utilized to read an RFID tag associated with a beverage forming ingredient package, such as 114A, upon insertion of the package 114A into the ingredient matrix 112. In this regard, the controller 105 may be used to obtain information related to or associated with the beverage forming ingredient package 114A. Such information may be used to identify within the ingredient matrix 112 an optimum or desired matrix location for placement of the beverage forming ingredient package 114A. In this regard, information related to the beverage forming ingredient package 114A may be manually entered into the controller 105 such that an optimum or desired matrix location can be identified. Once identified, a service personnel may be informed of the optimum or desired location within the ingredient matrix 112 by way of a suitable output devices 160, such as a light emitting diode (LED) display indicator, and/or informed by way of other types and kinds of output devices or display indicators as may be required and/or desired in a particular embodiment. Other embodiments may include output devices such as LCD screens, input/output (I/O) interfaces, and audio interfaces.

Furthermore, in one embodiment, a RFID tag associated with a beverage forming ingredient package, such as 114A, may be written to and/or modified such that the beverage forming ingredient package 114A is prevented or otherwise limited from being utilized by a second or other beverage forming dispenser. In this regard, should service personnel attempt to read the RFID tag a second time in an attempt to relocate the package into a second beverage forming dispenser it would be known to a second controller, via tag information or a network component, that the package has previously been inserted into a different beverage dispenser and as such would not allow the package to be operated in a second ingredient matrix. In operation, this may prevent or otherwise limit partially used packages from being transferred between beverage forming dispensers by way of determining via tag information or a network component the amount of an ingredient remaining within a particular beverage forming ingredient package.

In one embodiment, information associated with an amount of an ingredient remaining in a beverage forming ingredient package 114 may be written to a RFID tag associated with a beverage forming ingredient package, such as 114A. Such information may be written to the RFID tag after each use or prior to removal of the beverage forming ingredient package 114A from the ingredient matrix 112.

Figure 2A:
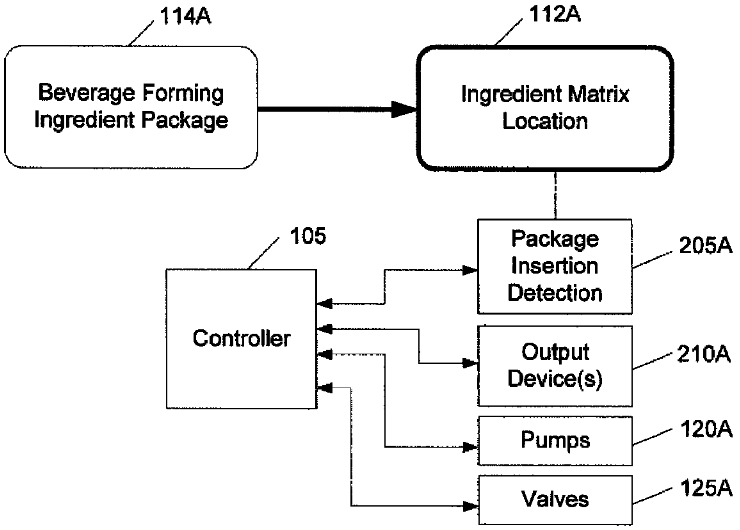
FIG. 2A illustrates one example of an operational relationship between a controller and an ingredient matrix location within an ingredient matrix in accordance with an embodiment of the invention.

Referring to FIG. 2A, there is illustrated one example of an operational relationship between a controller, such as controller 105, and an ingredient matrix location within an ingredient matrix, such as ingredient matrix 112. In one embodiment, a beverage forming ingredient package 114A may be inserted into an ingredient matrix location 112A. In operation, there may be dozens of individual packages 114A-114N which may be uniquely inserted into dozens of ingredient matrix locations 112. In this regard, each of the packages 114A-114N may be metered, pumped, and monitored to form beverages. FIG. 2A illustrates one such embodiment of one of the many package matrix location operational relationships. In a plurality of example embodiments the operational relationship depicted in FIG. 2A may be replicated many times in accordance with the size and number of ingredient matrix locations. Although controller 105, which may be a central controller, is shown in FIG. 2A as being associated with the ingredient matrix location, other controllers may be associated with an ingredient matrix location as desired in various embodiments of the invention. For example, the beverage forming dispenser 100 may include a distributed architecture in which each ingredient matrix location may be associated with a respective controller, as described in greater detail below with reference to FIG. 3. As another example, the beverage forming dispenser 100 may include a distributed architecture in which individual ingredient matrix locations and/or a subsets of the ingredient matrix locations are associated with respective controllers.

In one embodiment, package 114A may be inserted into ingredient matrix location 112A. To meter, pump, and monitor ingredient contents, a controller, such as controller 105, may be operationally related to a package insertion detection interface 205A, one or more output devices 210A, one or more pumps 120A, and/or one or more valves 125A. In a plurality of example embodiments, a combination of some or all of these and other features may be used as may be required and/or desired in a particular embodiment. As such, some embodiments may have less than all of the illustrated features while some may have more. As an example and not as a limitation, valves, such as valves 125, might not be required for each of the packages 114A-114N inserted in certain of the matrix locations 112A-112N. As such, if a valve, such as valve 125A, is not needed in the embodiment the embodiment may be effectuated without the valve. This adding and/or subtracting of features for a matrix location configuration may apply for each of the features illustrated in FIG. 2A and may vary as may be required and/or desired in a particular embodiment.

In operation, the package insertion detection interface 205A may be a limit switch, Hall Effect sensor, optical, and/or other types and kinds of package insertion detection interfaces as may be required and/or desired by a particular embodiment. In any instance, a package insertion detection interface 205A may be used to detect the insertion of a package, such as 114A, into a respective or particular ingredient matrix location, such as 112A.

Figure 2B:
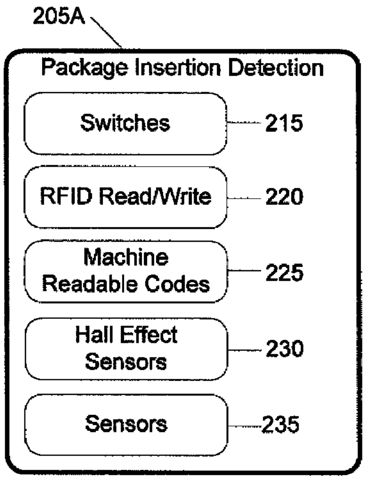
FIG. 2B illustrates one example of a plurality of package insertion detection interfaces in accordance with an embodiment of the invention.

Referring to FIG. 2B, there is illustrated one example of a plurality of package insertion detection interfaces 205A. Such interfaces 205A may include, for example and not limitation, as required and/or desired by a particular embodiment, switches 215, RFID reader/writer 220 (also referred to as RFID reader as shown in FIGS. 1E and 1F as 120), machine readable code reader 225, Hall Effect sensors 230, and/or sensors 235. For purposes of disclosure, RFID reader/writer 220, machine readable code reader 225, and manually entered information and data related to a beverage forming ingredient package, such as 114A, can be referred to as an ingredient package identifier.

Display indicator interface 210A in FIG. 2A may be a user interface or an output device such as a light emitting diode (LED) display interface, other display interface, or type of indicator or output device as may be required and/or desired in a particular embodiment. In operation, interface 210A may be utilized to direct service personnel to matrix locations and/or inform service personnel of certain operational status, operational condition, and/or utilized, for other purposes, as may be required and/or desired in a particular embodiment.

For example, as needed, one or more pumps, such as pumps 120A, may be utilized to pump ingredient contents from a particular package, such as 114A, once the package 114A has been correctly or suitably inserted into a respective matrix location, such as 112A, as may be required and/or desired in a particular embodiment.

In addition, as needed, one or more valves, such as valves 125A may be utilized to meter the flow of ingredients from a respective package, such as 114A, from a respective matrix location, such as 112A, or from the ingredient matrix, such as 112, during beverage formation as required and/or desired in a particular embodiment.

Figure 2C:
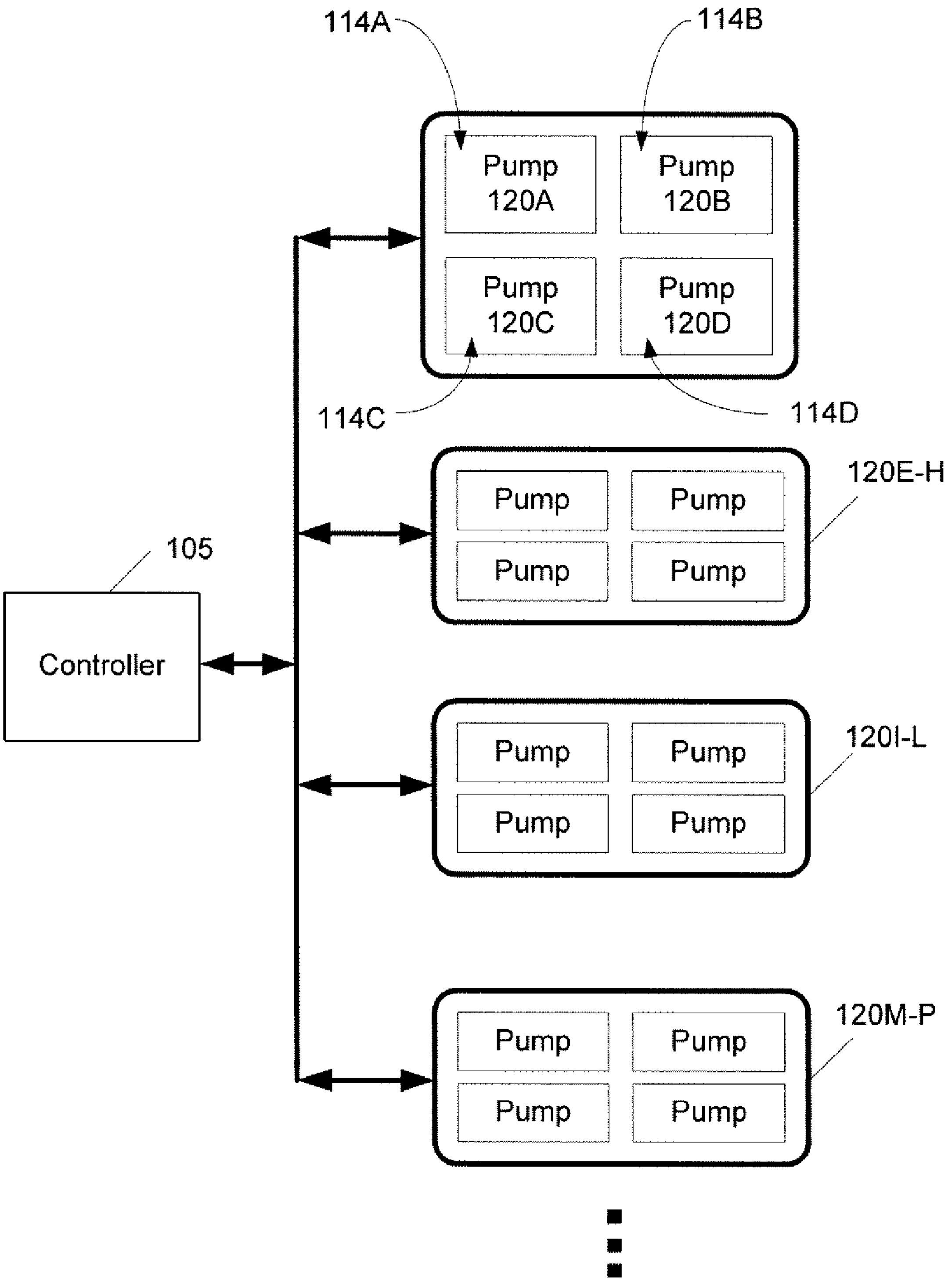
FIG. 2C illustrates one example of a plurality of beverage forming ingredient packages being associated with a plurality of pumps in accordance with an embodiment of the invention.

Referring to FIG. 2C, there is illustrated one example of a plurality of beverage forming ingredient packages being associated with a plurality of pumps. In one embodiment, a plurality of pumps, such as 120A-120P, may be operationally related to a controller, such as controller 105. Additionally, a plurality of beverage forming ingredient packages, such as 114A-114D, may be associated with some or all of the plurality of pumps, such as 120A-120D. In operation, controller 105 may create an association between the plurality of beverage forming ingredient packages 114A-114D and the pumps 120A-D and/or valves, shown as 125 in FIG. 2A. Although the association is illustrated in FIG. 2C as a one to one association of a pump, such as pump 120A to a beverage forming ingredient package, such as package 114A, other associations may be utilized as desired in various embodiments of the invention. For example, a plurality of pumps and/or valves may be associated with each beverage forming ingredient package.

An association between a plurality of beverage forming ingredient packages, such as 114A-114D, and a plurality of pumps, such as 120A-120D, may be stored as a last known good association such that each time the beverage forming dispenser is powered up and/or reset, a check for conflicts of the current association between the plurality of beverage forming ingredient packages and the pumps can be made. Such conflicts may include, for example and not as a limitation, a pungent beverage forming ingredient package being incorrectly located in the ingredient matrix, an agitation required beverage forming ingredient package being located in a non-agitated ingredient matrix location, at least two beverage forming ingredient packages being age and/or otherwise incompatible, and/or other types and kinds of conflicts, monitoring, and determination as may be required and or desired in a particular embodiment.

In one embodiment, as related to a service technician making repairs or a service person restocking the beverage forming dispenser, beverage forming ingredient packages and pumps may from time to time be removed, replaced, exchanged, or in other ways the dispenser and ingredients modified. In these conditions, it may be likely that beverage forming ingredient packages are moved to different slots and/or pump/valve assemblies are changed. As such, when the beverage forming dispenser is next powered up or reset only then will the changes be determinable and of operational consequence. For example and not as a limitation, if there is a beverage forming ingredient package in the incorrect or an unsuitable ingredient matrix location, the incorrect recipe may be poured. In addition, a replacement pump associated with an incorrect or unsuitable beverage forming ingredient package may cause the ratio of the pour to be incorrect resulting in poor beverage quality and/or taste. In this regard, often different ingredients have different viscosities. Furthermore, as viscosity of the ingredients change, from ingredient to ingredient, various characteristics of the pumps may be changed or otherwise adjusted in order to deliver the correct or suitable ingredient at a suitable ratio per the recipe.

Characteristics may be referred to herein as operational characteristics and may include, for example and not as a limitation, electrical and/or mechanical characteristics of at least one of the pumps to control or compensate for a viscosity of a particular ingredient being pumped.

An advantage of an embodiment of the invention is that once a known good association exists, the dispenser may obtain information related to a plurality of beverage forming ingredient packages located in the ingredient matrix, determine an association related to the operational relationship between each of the plurality of beverage forming ingredient packages and each of a plurality of pumps, determine if the association has changed by comparison to the last known good association, and modify the association if the association has changed to accommodate the new association.

In addition, another advantage of an embodiment of the invention can be that the plurality of said beverage forming ingredient packages configured within the ingredient matrix may be compared to a database of beverage recipes to form an available beverage menu.

Referring to FIG. 2C, there is illustrated a controller, such as controller 105, operationally related to a plurality of pumps, such as pumps 120A-P. In addition, there is an association made between the pumps 120A-D and a plurality of beverage forming ingredient packages 114A-D. In this regard, package 114A may be associated with pump 120A, package 114B may be associated with pump 102B, package 114C may be associated with pump 120C, and package 114D may be associated with pump 120D. In one embodiment, an association between any number of pumps 120A-P and packages 114A-D may be determined and stored as a last known good association. Additionally, in certain embodiments, more than one pump may be associated with a beverage forming ingredient package. On power up or reset, the plurality of packages 114 may be checked to determine whether the association with the plurality of pumps has changed (as compared the last known good association). If the association has changed, then the controller may attempt to dynamically reconfigure the pumps and packages association. If there are no conflicts, then the association may be updated and stored as the last known good association, and the system may start normally. If there are conflicts, then one or more prompting, attentions, and/or receipts of input may be needed or required before normal dispenser operation can resume.

With continued reference to FIG. 2C, a beverage forming dispenser, such as beverage forming dispenser 100 of FIG. 1, may include a central controller, such as controller 105, that controls the operation of the beverage forming dispenser 100. In one embodiment, the controller 105 may be in communication with a plurality of pumps, such as pumps 120A-120P (or 120A-120N in FIG. 1), and the controller 105 may control the operation of the pumps. As such, the controller 105 may directly control the operation of the pumps 120A-120P to form a variety of beverages. Although FIG. 2C illustrates a central controller, it will be understood that a plurality of controllers may be utilized in accordance with embodiments of the invention. For example, a plurality of nodes and/or controllers may be arranged or associated in a distributed architecture, as explained in greater detail below with reference to FIGS. 2D and 3.

Figure 2D:
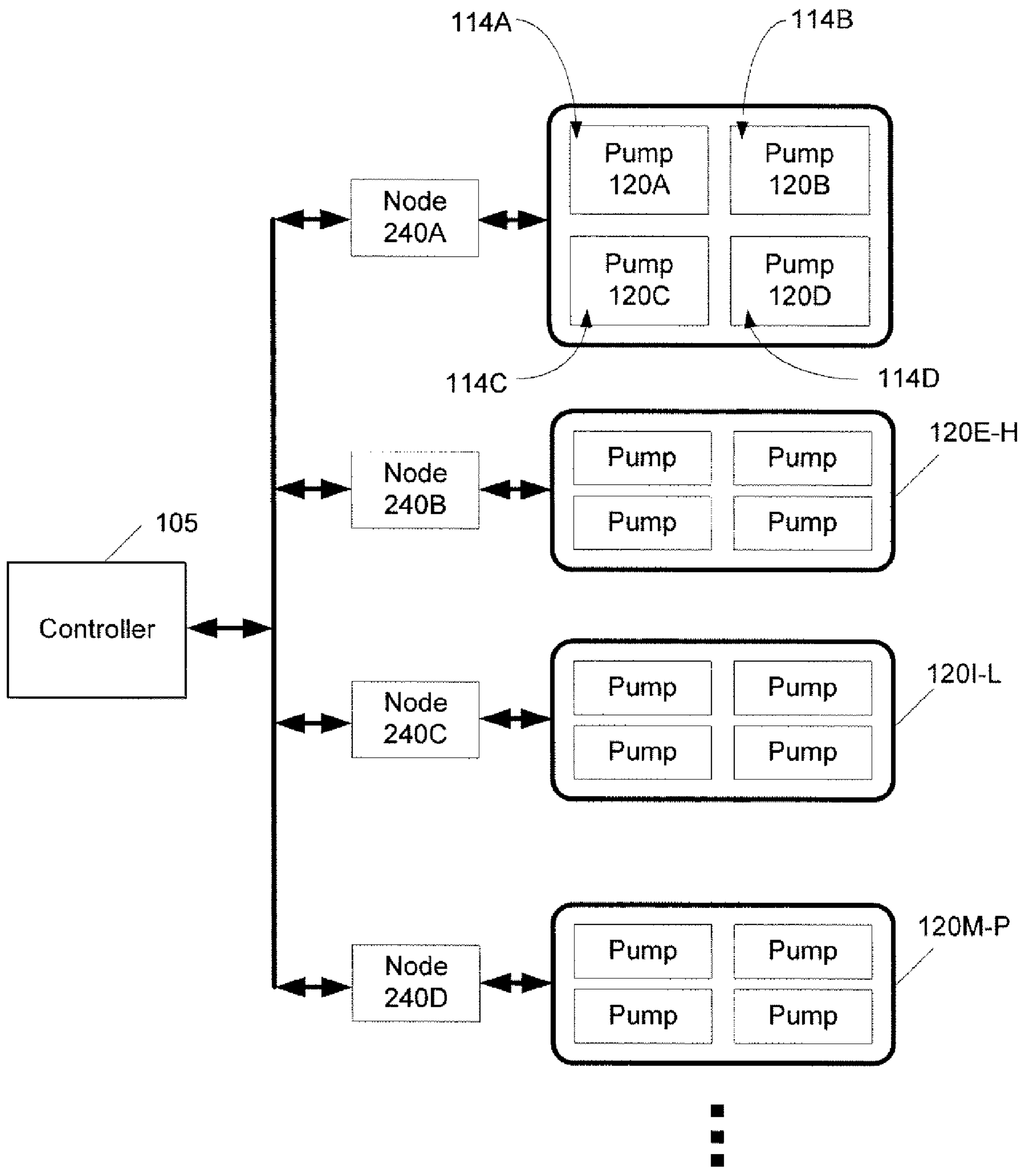
FIG. 2D illustrates one example of a plurality of beverage forming ingredient packages being associated with a plurality of pumps and interfaced to a controller by way of a plurality of bus nodes in accordance with an embodiment of the invention.

Referring to FIG. 2D, there is illustrated one example of a plurality of beverage forming ingredient packages, such as 114A-114D, being associated with a plurality of pumps, such as 120A-D, and interfaced to a controller 105 by way of one or more of a plurality of nodes, such as node 240A. In one embodiment, a plurality of nodes 240A-240D may be utilized to interface a plurality of pumps/valves 120A-120P, 125 (shown in FIG. 2A) to a network bus. In this regard, the bus may form a relatively more efficient way for a controller 105 to data communicate and/or control the pumps/valves 120A-120P, 125. In one embodiment, the bus node 240A-240D may effectuate embedded microcontroller functionality and/or be a network interface device effectuating network communications between controllers and devices such as pumps/valves 120A-120P, 125 and/or other types and kinds of devices as may be required and or desired in a particular embodiment. Such network communications may include CAN, OPEN CAN, RS232, ETHERNET, RS485, wired, wireless, and/or other types and kinds of bus node effectuated network communications as may be required and or desired in a particular embodiment.

An advantage of an embodiment of the invention may be that that once a known good association exists, the dispenser may obtain information related to a plurality of beverage forming ingredient packages located in the ingredient matrix, determine an association related to the operational relationship between each of the plurality of beverage forming ingredient packages, each of a plurality of pumps, each of the plurality of nodes 240A-240D, determine if the association has changed by comparison to the last known good association, and modify if the association has changed, the beverage forming dispenser to accommodate the new association. In this regard, if a node is replaced or relocated in the ingredient matrix, the last known good association may be utilized to detect, resolve conflicts, and/or update a new association as may be required and/or desired in a particular embodiment.

Figure 3:
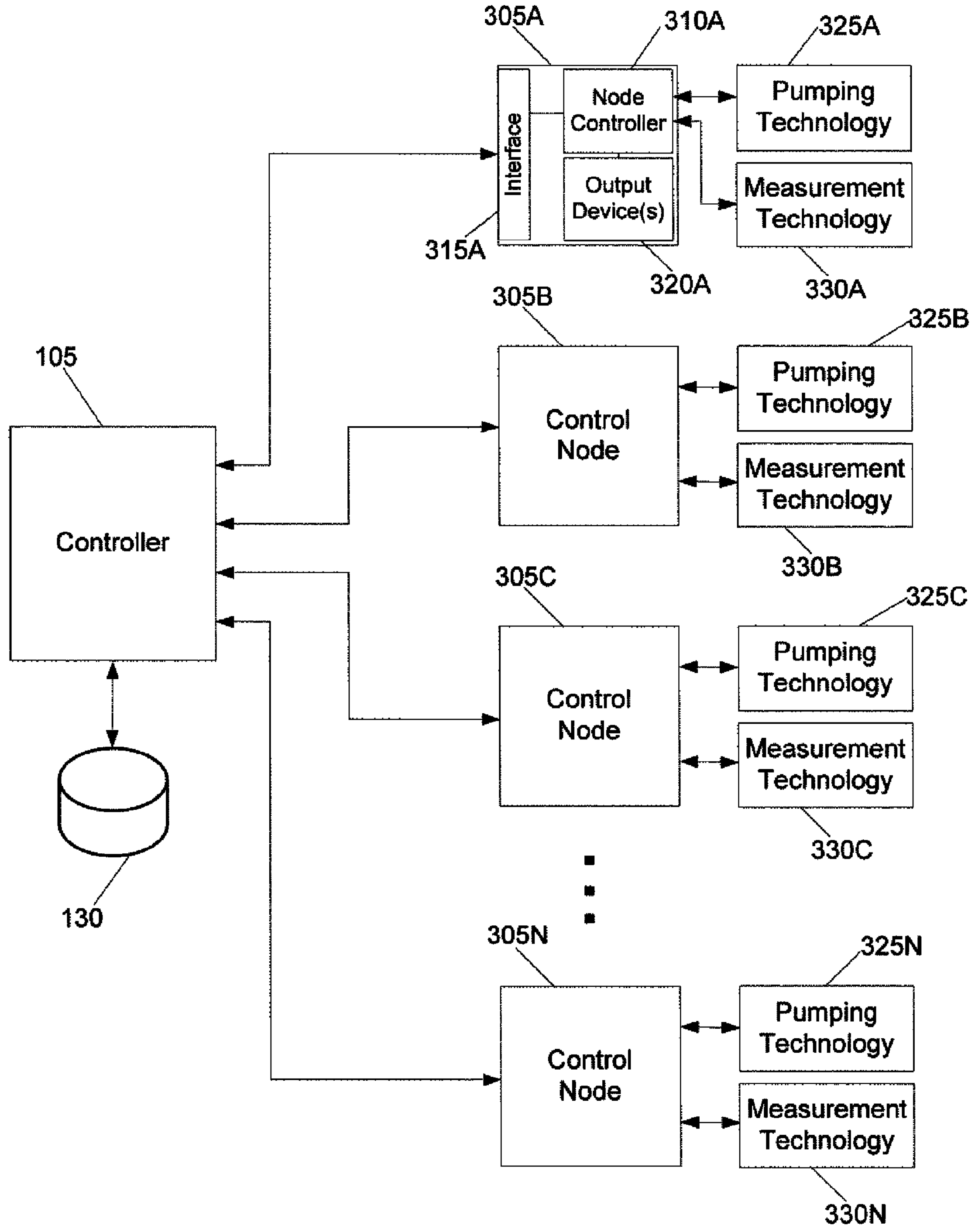
FIG. 3 illustrates one example of a plurality of control nodes being associated with a controller in accordance with an embodiment of the invention.

Referring to FIG. 3, there is illustrated one example of a plurality of control nodes, such as 305A-305N, being associated with a controller of a beverage forming dispenser, such as controller 105. In one embodiment, each control node 305A-305N may be associated with a particular beverage forming ingredient such as ingredients 114A-114Q shown in FIG. 1. However, in certain other embodiments, each control node 305A-305N may be associated with a plurality of beverage forming ingredients.

In one embodiment in which each control node 305A-305N may be associated with a beverage forming ingredient, such as 114A-114Q shown in FIG. 1, each control node 305A-305N may control the pumping of a respective beverage forming ingredient, such as 114A-114Q. In this regard, each control node 305A-305N may be in communication with respective pumping technology 325A-325N and/or measurement technology 330A-330N associated with the beverage forming ingredients. In one embodiment, a control node 305A may be associated with pumping technology 325A and/or measurement technology 330A for a first beverage forming ingredient, such as 114A shown in FIG. 1. As such, a control node 305B may be associated with pumping technology 325B and/or measurement technology 330B for a second beverage for a second beverage forming ingredient, such as 114B shown in FIG. 1. Similarly, control node 305C may be associated with pumping technology 325C and/or measurement technology 330C, continuing through a total number 'N' of control nodes, pumping technology, and/or measurement technology represented as 305N, 325N, and 330N respectively.

In one embodiment, suitable pumping technology, such as 325A, may be utilized to precisely pump a beverage forming ingredient, such as 114A shown in FIG. 1, for a beverage. A wide variety of different pumping technologies may be utilized as desired in various embodiments of the invention to precisely pump a beverage forming ingredient 114A. For example, one or more suitable solenoid pumps may be utilized to pump a beverage forming ingredient 114A. In one embodiment, one or more NME1C Evolution Micropumps, manufactured by Ulka S.r.l. may be utilized to pump a beverage forming ingredient, such as 114A. In operation, a micropump may be energized for approximately 15 ms, causing a plunger to be pulled back, thereby drawing or pulling a beverage forming ingredient into the micropump. The micropump may then be actuated causing the beverage forming ingredient to be passed downstream through the pump. In one embodiment, four (4) solenoid pumps may be utilized to pump a beverage forming ingredient, such as 114A. Other types of pumps, combinations of pumps, and suitable pumping technology may be utilized in accordance with embodiments of the invention as may be required and/or desired in a particular embodiment.

A control node, such as control node 305A, may be associated with the pumping technology, such as 325A, that is utilized to pump a particular beverage forming ingredient, such as 114A. One advantage of associating a control node 305A with a particular beverage forming ingredient 114A is that the control node 305A may be configured to operate in conjunction with the pumping technology 325A utilized in conjunction with the particular beverage forming ingredient 114A. In this regard, if different pumping technology is utilized in conjunction with different beverage forming ingredients, then respective control nodes associated with the different beverage forming ingredients may utilize and/or incorporate different components and/or control logic as required by the pumping technologies that are utilized. Additionally, if the pumping technology associated with a particular beverage forming ingredient is updated, altered, or replaced, then the associated control node may be updated, altered, or replaced to account for the change in the pumping technology. By updating, altering, or replacing a control node, it may not be necessary to update or replace a central controller associated with a beverage forming dispenser, such as controller 105. In other words, the central controller 105 may function independently of the pumping technology that is utilized in association with the various beverage forming ingredients 114.

In one embodiment, suitable measurement technology, such as 330A, may be utilized to monitor a volume or amount of beverage forming ingredient, such as 114A shown in FIG.

1, that is dispensed for a beverage. A wide variety of different measurement technologies may be utilized as desired in various embodiments of the invention to measure the pumping of a beverage forming ingredient 114A. As one example of measurement technology, one or more counters may be utilized to determine the number of times that a pump, such as a solenoid pump, has been actuated. In this regard, if the volume or amount of beverage forming ingredient that is pumped with each actuation of the solenoid pump is known or closely estimated, then the total volume or amount of beverage forming ingredient that is pumped may be determined or calculated by suitable components of the measurement technology, by an associated control node, such as node 305A, and/or by an associated controller, such as controller 105. For example, approximately 0.01 microliters of beverage forming ingredient may be pumped with each actuation of a solenoid pump. As the solenoid pump is actuated a plurality of times during the dispense of a beverage, a counter may be utilized to track the number of actuations and a determination of the total amount of a beverage forming ingredient that is pumped for a beverage may be made. As an extension to this example, one or more counters may track the number of actuations of a plurality of solenoid pumps associated with a beverage forming ingredient package 114. In one embodiment, four (4) solenoid pumps may be associated with a beverage forming ingredient package, such as 114A, and the four solenoid pumps may be utilized to pump beverage forming ingredient from the package 114A. One or more counters may then be utilized to track the number of actuations for the plurality of solenoid pumps.

As another example of measurement technology, one or more suitable flow meters may be utilized in association with measuring an amount or volume of beverage forming ingredient that is pumped from a beverage forming ingredient package, such as 114A. A wide variety of flow meters may be utilized in association with embodiments of the invention, for example, suitable pressure-velocity liquid flow meters, suitable paddle wheel style flow meters, and/or suitable gear meters. A paddle wheel style flow meter may utilize an emitter/detector light emitting diode (LED) pair in association with a paddle wheel that cuts through a beam generated by the LED pair as the paddle wheel rotates, thereby allowing an accurate measurement of flow rate. A gear meter may utilize a set of gears that rotate as fluid flows through the gears. A magnet may be attached to a shaft that is connected to one of the gears. As the shaft rotates, one or more encodes may be utilized to detect the rotation and determine a flow rate. In one embodiment, one or more flow meters may be utilized in association with continuous ingredients supplies, such as the carbonated water supply 1140 and/or the water supply 114Q shown in FIG. 1. In operation, during the dispense, of a beverage, one or more flow meters may be utilized to measure the flow of a beverage forming ingredient, such as the carbonated water supply 114O, as it is pumped or otherwise provided to a nozzle of a beverage forming dispenser for dispense, such as nozzle 140. The measured flow rate may then be processed by suitable components of the measurement technology, by an associated control node, such as node 305A, and/or by an associated controller, such as controller 105 in order to determine or calculate an amount or volume of carbonated water that is provided to the nozzle 140 for dispense.

In certain embodiments, more than one type of suitable measurement technology may be utilized in association with a beverage forming dispenser, such as dispenser 100 shown in FIG. 1. For example, a first type of measurement technology may be utilized in association with measurements of an amount or volume of beverage forming ingredients that are supplied from beverage forming ingredient packages, such as 114A, while a second type of measurement technology may be utilized in association with measurements of an amount or volume forming ingredients that are supplied from a continuous supply, such as 114O. Additionally, in certain embodiments, more than one type of suitable measurement technology may be utilized in association with a single beverage forming ingredient. The measurements obtained from the various measurement technologies that are utilized may be compared with one another and/or averaged together in order to obtain greater accuracy.

A control node, such as control node 305A, may be associated with the measurement technology, such as 330A, that is utilized to measure the amount or volume of a particular beverage forming ingredient, such as 114A, that is pumped. Additionally, the measurement technology 330A may be remote to and/or incorporated into the associated control node 305A. One advantage of associating a control node 305A with a particular beverage forming ingredient 114A is that the control node 305A may be configured to operate in conjunction with the measurement technology 330A utilized in conjunction with the particular beverage forming ingredient 114A. In this regard, if different measurement technology is utilized in conjunction with different beverage forming ingredients, then respective control nodes associated with the different beverage forming ingredients may utilize and/or incorporate different components and/or control logic as required by the measurement technologies that are utilized. Additionally, if the measurement technology associated with a particular beverage forming ingredient is updated, altered, or replaced, then the associated control node may be updated, altered, or replaced to account for the change in the measurement technology. By updating, altering, or replacing a control node, it may not be necessary to update or replace a central controller associated with a beverage forming dispenser, such as controller 105. In other words, the central controller 105 may function independently of the measurement technology that is utilized in association with the various beverage forming ingredients 114.

In one embodiment, a control node, such as node 305A may include a node controller, such as node controller 310A, an interface, such as interface 315A, and/or one or more output devices, such as device(s) 320A. The node controller 310A may control the operations of the control node 305A. The node controller 310A may be any suitable controller, computing device, or plurality of devices, for example, a microcontroller, minicomputer, etc. The node controller 310A may include similar components and functionality to that described above with reference to FIG. 1 for the controller 105. For example, the node controller 310A may include a memory and a processor. The processor may execute stored programmed logic (e.g., software) in accordance with embodiments of the invention in order to control the operation of the control node 305A, the associated pumping technology 325A, and/or the associated measurement technology 330A.

In one embodiment, the node controller 310A may store data associated with a beverage forming ingredient that is monitored and controlled by the control node 305A. The stored information or a portion of the stored information may be obtained from a variety of sources. For example, the stored information may be obtained from the controller 105 once the control node 305A has been associated with a beverage forming ingredient packet, such as 114A. Additionally or alternatively, at least a portion of the stored information may be obtained from the beverage forming ingredient packet 114A via an associated machine readable code reader, such as 170A shown in FIG. 1. A wide variety of information associated with the beverage forming ingredient may be stored by the control node 305A as desired in embodiments of the invention. In one embodiment, the control node 305A may store information associated with the fluid characteristics of the beverage forming ingredient and/or with the associated pumping technology 325A. For example, the control node 305A may store information in a calibration matrix that outlines parameters for pumping various fluids or fluid types, such as, viscosities. The stored information may be utilized to control the pumping of a beverage forming ingredient. For example, the stored information may establish and/or be utilized to determine one or more settings or parameters associated with the pumping technology 325A utilized to pump a beverage forming ingredient. A wide variety of settings or parameters associated with the pumping technology may be established or determined utilizing the stored information, for example, a voltage utilized for a pumping operation and/or an amount or volume of beverage forming ingredient that will be pumped by the pumping technology 325A during a pumping operation.

As another example of information that may be stored by a control node 305A, a control node 305A may store an ingredient table associated with one or more beverage forming ingredients. The ingredient table may include a wide variety of information including, but not limited to, viscosity information and/or shelf life information associated with one or more beverage forming ingredients. The control node 305A that it is monitoring and/or control the pumping of a beverage forming ingredient may access at least a portion of this information in order to determine that a beverage forming ingredient is still capable of being pumped and/or whether the beverage forming ingredient is being pumped properly.

The node controller 310A may receive input or data from other components of the control node 305A, from associated pumping technology 325A, from associated measurement technology 330A, and/or from other components of a beverage forming dispenser, such as controller 105, as desired in embodiments of the invention. The node controller 320A may also output data or control the output of data to other components of the control node 305A, to associated pumping technology 325A, to associated measurement technology 330A, to one or more other components of a beverage forming dispenser, such as controller 105, and/or to one or more suitable output devices 320A, as desired in embodiments of the invention. The one or more suitable output devices 320A may include, for example, LED indicators, displays, etc.

The interface 315A may facilitate communication between the node controller 310A and the controller 105. The interface 315A may be integrated into the node controller 310A or, alternatively, situated remotely to the node controller 310A. Additionally, the interface 315A may be utilized to facilitate communication between the node controller 310A and the associated pumping technology 325A, the associated measurement technology 330A, and/or the one or more output devices 320A.

In one embodiment, a control node, such as node 305A may be in communication with a controller of a beverage forming dispenser, such as controller 105. The controller 105 may be a central controller within a distributed architecture. In one embodiment, a control node, such as 305A, may be in communication with a controller, such as 105, via suitable network communication. Such network communications may include CAN, OPEN CAN, RS232, ETHERNET, RS485, wired, wireless, and/or other types and kinds of network communications as may be required and or desired in a particular embodiment.

In one embodiment, once a beverage is selected for dispense, the controller 105 may access a recipe to form the selected beverage from an associated database, such as database 130. The recipe may indicate the beverage forming ingredients that are needed to dispense the selected beverage and the ratio of the needed ingredients. The controller 105 may communicate information associated with a dispense of a needed beverage forming ingredient to a control node, such as 305A, associated with the beverage forming ingredient. The communicated information 105 may include information associated with the desired ratio, a desired flow rate of the beverage forming ingredient, a desired volume of the beverage forming ingredient, a desired cup size for the selected beverage, and/or other information as may be desired in an embodiment of the invention. The controller 105 may also communicate an order or command to the control node 305A to commence the dispense of the beverage forming ingredient utilizing the desired flow rate, ratio and/or volume. The commence order may be communicated concurrently with or subsequent to the communication of the information associated with the desired flow rate ratio and/or volume. In response to the commence order, the control node 305A may cause the beverage forming ingredient to be dispensed in accordance with the desired flow rate, ratio and/or volume. The control node 305A, in association with the pumping technology 325A and the measurement technology 330A may monitor and precisely control the dispense of the beverage forming ingredient. In this regard, each beverage forming ingredient for a selected beverage may be precisely monitored and controlled by associated control nodes, such as 305A-N. For purposes of disclosure, a control node may be referred to as control node 305.

Although the pumping technology 325A-325N and measurement technology 330A-330N associated with the various beverage forming ingredients is described with reference to FIG. 3 above as being associated with respective control nodes 305A-305N, certain embodiments of the invention may associate a single control node with the pumping technology and/or the measurement technology for a plurality of beverage forming ingredients. Additionally, certain embodiments of the invention may utilize a central controller, such as controller 105, to control the pumping technology and/or the measurement technology for one or more beverage forming ingredients. For example, in one embodiment of the invention, controller 105 may be directly associated with pumping technology 325A-325N and measurement technology 330A-330N.

According to certain embodiments of the invention, a beverage forming dispenser, such as dispenser 100, may independently monitor the pumping or dispense of each of the beverage forming ingredients. Various parameters associated with the pumping or dispense of each of the beverage forming ingredients may be monitored including, but not limited to, the respective flow rates of the beverage forming ingredients and/or the respective volumes or amounts of the beverage forming ingredients that are dispensed. Additionally, the pumping or dispense of one or more of the beverage forming ingredients may be adjusted, limited, and/or ceased based at least in part on the independent monitoring of the beverage forming ingredients. In some embodiments of the invention, the independent monitoring of each of the beverage forming ingredients may be conducted or carried out by a central controller, such as controller 105, in association with measurements received from suitable sensors and/or measurement technology, such as sensors 127 and/or measurement technology 330A-330N, that are respectively associated with the beverage forming ingredients. In other embodiments of the invention, the independent monitoring of each of the beverage forming ingredients may be conducted or carried out be one or more control nodes, such as node 305A, that are associated with a central controller, such as controller 105, and suitable measurement technology, such as measurement technology 330A-330N. In one embodiment of the invention, respective control nodes, such as 305A-305N, may be associated with each of the beverage forming ingredients, and each of the control nodes may monitor the pumping and dispense of the beverage forming ingredient that it is associated with.

Figure 4:
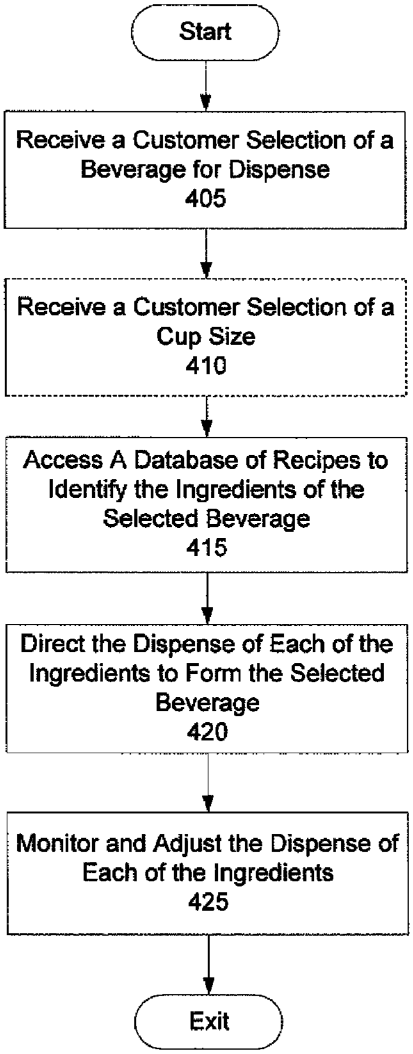
FIG. 4 illustrates one example of a method for receiving customer input for a selected beverage and directing the dispense of the selected beverage in accordance with an embodiment of the invention.

FIG. 4 illustrates one example of a method for receiving customer input for a selected beverage and directed the dispense of the selected beverage in accordance with an embodiment of the invention. In one embodiment, receiving customer input for a selected beverage and directing the dispense of the selected beverage includes receives a customer selection of a beverage for dispense, receiving a customer selection of a cup size, accessing a database of recipes to identify the ingredients of the selected beverage, and directing the dispense of each of the ingredients to form the selected beverage. In one embodiment, the method of FIG. 4 may be carried out or performed by a controller of a beverage forming dispenser, such as controller 105.

In block 405, a customer selection of a beverage for dispense may be received. The customer selection of the beverage for dispense may identify one of a plurality of selectable beverages that may be dispensed by a beverage forming dispenser, such as dispenser 100. The customer selection of a beverage for dispense may be received via one or more suitable input devices, such as input devices 165 shown in FIG. 1. Processing then moves to block 410.

In block 410, a customer selection of a cup size may optionally be received. For example, a customer selection of a cup size may be received if a portion control dispense is conducted. The customer selection of a cup size for dispense may identify one of one or more cup sizes that may be associated with the beverage forming dispenser 100. For example, the customer may select one of a small, medium, large, or extra-large cup size. The customer selection of a cup size may be received via one or more suitable input devices, such as input devices 165 shown in FIG. 1. The customer selection of a cup size may be received in association with a customer input that is separate from the customer input received for a selection of a beverage for dispense or, alternatively, the customer selection of a cup size may be received in association with a customer input that is combined with a customer input for a selection of a beverage for dispense. For example, a customer may select separate buttons or options for a cup size and for a beverage selection, such as an option for a small cup size and an option for a COCA-COLA™ beverage. As another example, a customer may select a single button or option for both a cup size and a beverage selection, such as an option for a small COCA-COLA™ beverage.

A wide variety of different cup sizes may be utilized in association with the beverage forming dispenser 100. In one embodiment of the invention, the respective amounts or volumes of liquid and/or other ingredients that may be held by the variety of different cup sizes may be stored in a suitable memory associated with the beverage forming dispenser 100, such as memory 180 and/or database 130. The variety of different cup sizes and their respective amounts or volumes may be stored in the suitable memory during a configuration or calibration of the beverage forming dispenser 100 by a customer or technician. Alternatively, the variety of different cup sizes and their respective amounts or volumes may be pre-stored in the suitable memory as default settings.

Following the receipt of customer selections, processing then moves to block 415.

In block 415, a database, such as database 130, may be accessed to identify the ingredients of the selected beverage. The accessed recipe may indicate the beverage forming ingredients that are combined to form the selected beverage. Additionally, the accessed recipe may indicate a ratio of the various beverage forming ingredients for the selected beverage. For example, the ratio of the various beverage forming ingredients may be specify and/or be utilized to determine rates at which each of the beverage forming ingredients should be pumped or dispensed in order to form the selected beverage. The rates at which each of the beverage forming ingredients should be pumped or dispensed in order to form the selected beverage may also be referred to as flow rates. Following the accessing of the database 130, processing may move to block 420.

In block 420, the dispense of each of the beverage forming ingredients specified in the recipe may be directed in order to form the selected beverage. In certain embodiments of the invention, a central controller, such as 105, may direct one or more control nodes, such as 305, associated with the beverage forming ingredients to dispense the beverage forming ingredients in order to form the selected beverage. The one or more control nodes may then control the pumping of the beverage forming ingredients. In other embodiments of the invention, a central controller, such as 105, may directly control the pumping of the beverage forming ingredients. Following the directions of the dispense of each of the beverage forming ingredients, processing may move to block 425.

In block 425, the pumping and/or dispense of one or more of the beverage forming ingredients may be monitored. The monitoring of the beverage forming ingredients may be conducted by a central controller, such as controller 105, and/or by one or more control nodes, such as node 305. Additionally, suitable measurement technology, such as measurement technology 330A-330N, may be utilized in association with the controller 105 and/or the one or more control nodes in order to monitor the beverage forming ingredients.

Based at least in part on the monitoring of the pumping and/or dispense of one or more of the beverage forming ingredients, one or more determinations may be made as to whether the monitored beverage forming ingredients are dispensing properly and/or dispensing at a desired rate. If it is determined that a monitored beverage forming ingredient is not dispensing properly and/or is not being dispensed at a desired rate, the pumping of the monitored beverage forming ingredient may be adjusted as desired in an embodiment.

The example of a method for receiving customer input for a selected beverage and directed the dispense of the selected beverage may end following block 425.

According to certain embodiments of the invention, a beverage forming dispenser, such as dispenser 100, may be configured to dispense portion controlled amounts or volumes of selected beverages. The portion control dispenses may be configured according to input and/or preferences of a customer, consumer, or user of the beverage forming dispenser 100. The portion control dispenses may be quickly and easily programmed and configured for the beverage forming dispenser 100. In one embodiment, portion control dispenses may be calibrated or initialized for multiple beverage selections concurrently with one another. In other words, a simplified procedure, method, or process may be utilized to calibrate or configure portion control dispenses for multiple beverage selections. Additionally, portion control dispenses may be calibrated or initialized for multiple cup sizes or pour sizes for one or more of the beverage selections. In this regard, a portion control dispense may be performed by the beverage forming dispenser 100 in response to customer input that includes a beverage selection and a cup size selection.

Figure 5:
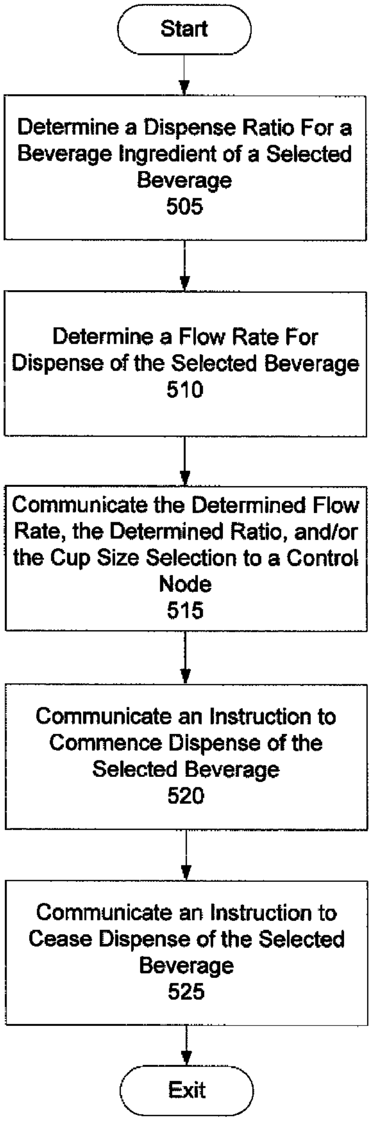
FIG. 5 illustrates one example of a method for directing a control node associated with a beverage forming ingredient to dispense the associated beverage forming ingredient in accordance with an embodiment of the invention.

FIG. 5 illustrates one example of a method for directing a control node associated with a beverage forming ingredient to dispense the associated beverage forming ingredient in accordance with an embodiment of the invention. The method may include determining a dispense ratio for a beverage ingredient of a selected beverage, determining a flow rate for dispense of the selected beverage, communicating the determined flow rate and/or the determined ratio to a control node, communicating an instruction to commence dispense to the control node, and communicating an instruction to cease dispense to the control node.

In block 505, a dispense ratio for a beverage ingredient of a selected beverage may be determined. The dispense ratio for the beverage ingredient may be determined based at least in part on a recipe for the selected beverage, such as a recipe that is accessed from a suitable database of a beverage forming dispenser 100, such as database 130. The dispense ratio may define an amount of the beverage ingredient that needs to be dispensed relative to the dispense of amounts of one or more other ingredients of the selected beverage. For example, a selected beverage may be formed of approximately ten parts carbonated water and approximately one part flavor syrup. Thus, the dispense ratio for the selected beverage may be expressed as a 10:1 ratio. In this example, for any amount of syrup that is dispensed, approximately ten times that amount of carbonated water should be dispensed. Alternatively, for any amount of beverage that is dispensed, approximately one eleventh ($\frac{1}{11}$) of that amount of beverage should be syrup and approximately ten elevenths ($\frac{10}{11}$) of that amount of beverage should be carbonated water.

In block 505, the dispense ratio for a beverage ingredient of a selected beverage may be determined. Using the example above for the syrup, the ratio of syrup to carbonated water based at least in part on the recipe for the selected beverage may be expressed as 1:10. Accordingly, the dispense ratio for the syrup may be expressed as approximately 1:11. In other words, for an amount of beverage that is dispensed, approximately one eleventh ($\frac{1}{11}$) of that amount of beverage should be syrup. Once a dispense ratio has been determined for a beverage ingredient, processing may move to block 510.

In block 510, a flow rate for the dispense of the selected beverage may be determined or identified. The flow rate for the dispense of the selected beverage may be based at least in part on characteristics associated with the selected beverage, for example, foaming characteristics of the selected beverage. It may be desirable to dispense a beverage with higher foaming characteristics at a lower flow rate or dispense rate than a beverage with lower relative foaming characteristics. For example, it may be desirable to dispense a carbonated beverage at a lower flow rate than a non-carbonated beverage. Any characteristics associated with the selected beverage that are utilized in a determination of the flow rate for dispense may be stored in a suitable memory associated with a beverage forming dispenser 100, such as memory 180 or database 130. As an alternative to determining a flow rate for the selected beverage, a flow rate may be defined and pre-stored for the selected beverage in a suitable memory. For example, a default flow rate for the selected beverage may be stored in association with the recipe for the selected beverage.

The flow rate for the dispense of the selected beverage may be independent of a cup size that may be selected for dispense or, alternatively, the flow rate for dispense of the selected beverage may be determined and/or adjusted based at least in part on the cup size. In certain embodiments of the invention, it may be desirable to dispense a selected beverage at a higher flow rate if the selected beverage is being dispensed into a larger cup. Additionally, the flow rate of any beverage may be adjusted during the dispense of the selected beverage as the cup begins to fill up in order to minimize splash and/or splatter associated with the dispense.

Following the determination of a flow rate for dispense of the selected beverage, processing may move to block 515.

In block 515, one or more dispense parameters associated with the dispense of an ingredient of the selected beverage may be communicated to a control node associated with the dispense of the beverage ingredient, such as node 305. At least a portion of the dispense parameters may be utilized by the control node 305 to configure and/or carry out the dispense of the beverage ingredient. A wide variety of dispense parameters may be communicated to the control node 305 as desired in embodiments of the invention including, but not limited to, a recipe of a selected beverage, a ratio of the ingredients of the selected beverage, a dispense ratio for the selected beverage, a flow rate for the selected beverage, a flow rate for the beverage ingredient, and/or a cup size for the dispense. In one embodiment, the determined flow rate and/or the determined dispense ratio may be communicated to the control node 305. In certain embodiments of the invention, the control node 305 may be operable to determine or access information associated with the selected beverage, such as, the recipe for the beverage and/or a flow rate for the beverage, and the control node 305 may be operable to determine dispense parameters for the beverage ingredient.

Following the communication of the one or more dispense parameters associated with the dispense of a beverage ingredient to a control node, processing may move to block 520.

In block 520, an instruction to commence the dispense of the selected beverage may be communicated to the one or more control nodes associated with the dispense of the various ingredients of the selected beverage. Alternatively, respective instructions to commence the dispense of each of the beverage ingredients may be respectively communicated to the one or more control nodes associated with the pumping and/or dispense of the beverage ingredients. The one or more control nodes may be operable to initiate the pumping of the various ingredients of the selected beverage in response to the instruction(s) to commence the dispense. Operations may then move to block 525.

In block 525, an instruction to cease the dispense of the selected beverage may be communicated to the one or more control nodes associated with the dispense of the various ingredients of the selected beverage. Alternatively, respective instructions to cease the dispense of each of the beverage ingredients may be respectively communicated to the one or more control nodes associated with the pumping and/or dispense of the beverage ingredients. The one or more control nodes may be operable to cease the pumping of the various ingredients of the selected beverage in response to the instruction(s) to commence the dispense.

Prior to the communication of the instruction(s) to cease dispense, an amount or volume of the selected beverage may be dispensed. The amount or volume of the selected beverage that is dispensed may be monitored and the communication of the instruction(s) to cease dispense may be based at least in part on the monitoring of the amount or volume. Alternatively, the time of dispense for the selected beverage may be monitored and the communication of the instruction(s) to cease the dispense may be based at least in part on the monitoring of the time of dispense. Alternatively, the communication of the instruction(s) to cease dispense may be based at least in part on customer input received via one or more suitable input devices, such as input devices 165 shown in FIG. 1. As an example, a beverage may be dispensed while a customer actuates, depresses, or otherwise selects a dispense input, and the dispense may be ceased once the customer ceases to actuate, depress, or otherwise select the dispense input. As another example, a dispense may be commenced based at least in part on the actuation or selection of a dispense input and the dispense may be ceased based at least in part on the actuation or selection of a cease dispense input.

The example of a method for directing a control node associated with a beverage forming ingredient to dispense the associated beverage forming ingredient may end following block 525.

Although the method of FIG. 5 is described as a method for directing a control node to dispense a beverage forming ingredient, in certain embodiments of the invention, a central controller, such as controller 105, may directly control the dispense of a beverage forming ingredient.

Figure 6:
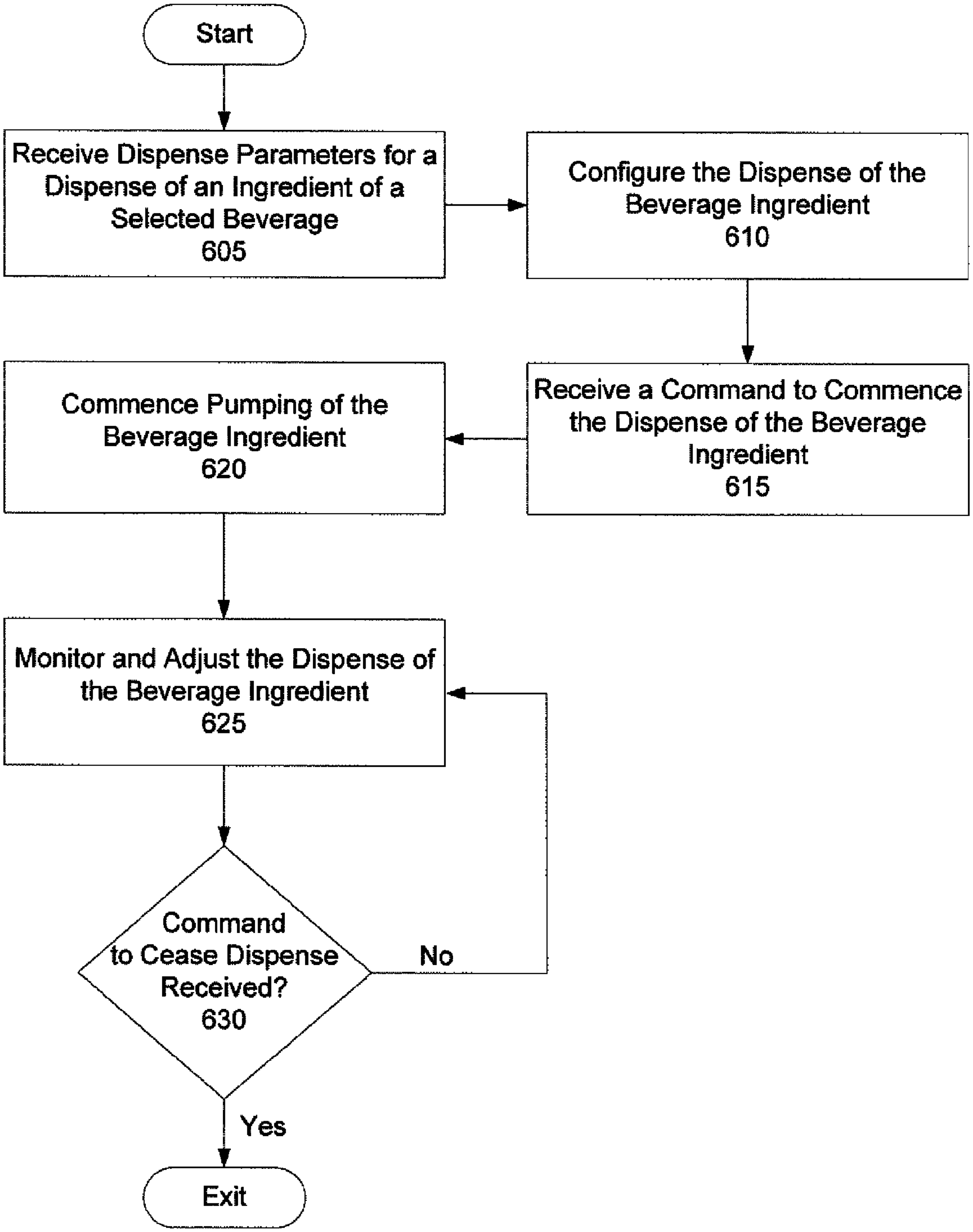
FIG. 6 illustrates one example of a method for controlling the dispense of a beverage forming ingredient by an associated control node in accordance with an embodiment of the invention.

FIG. 6 illustrates one example of a method for controlling the dispense of a beverage forming ingredient by an associated control node in accordance with an embodiment of the invention. The method for controlling the dispense of a beverage forming ingredient by an associated control node may include receiving one or more dispense parameters for a dispense of the beverage forming ingredient, configuring the dispense of the beverage forming ingredient, receiving a command to commence the dispense of the beverage forming ingredient, commencing the pumping of the beverage forming ingredient, and monitoring and adjusting the dispense of the beverage forming ingredient until a command to cease the dispense of the beverage forming ingredient is received.

In block 605, a control node associated with a beverage forming ingredient, such as node 305, may receive one or more dispense parameters associated with the dispense of a beverage forming ingredient. The beverage forming ingredient may be an ingredient of a selected beverage. The one or more dispense parameters may be received via a suitable network. A wide variety of dispense parameters may be received by the control node 305 as desired in embodiments of the invention including, but not limited to, a recipe of a selected beverage, a ratio of the ingredients of the selected beverage, a dispense ratio for the selected beverage, a flow rate for the selected beverage, a flow rate for the beverage ingredient, a cup size for the dispense, a type of ice for the dispense, and/or an amount, volume, or ratio of ice for the dispense. In one embodiment, the determined flow rate and/or the determined dispense ratio may be received by the control node 305. In certain embodiments of the invention, the control node 305 may be operable to determine or access information associated with the selected beverage, such as, the recipe for the beverage and/or a flow rate for the beverage, and the control node 305 may be operable to determine dispense parameters for the beverage ingredient. Once the one or more dispense parameters are received, operations may move to block 610.

In block 610, the control node 305 may configure the dispense of the beverage forming ingredient for the selected beverage. The control node 305 may configure the dispense of the beverage forming ingredient based at least in part on at least one of the one or more received dispense parameters. Additionally, the control node 305 may configure the dispense based at least in part on characteristics associated with the beverage forming ingredient that are stored in a suitable memory associated with the control node 305, such as a memory associated with a node controller of the control node 305. In certain embodiments, at least a portion of the characteristics associated with the beverage forming ingredient may be stored in a memory that is located remote to the control node 305 and communicated to the control node via a network. Many different characteristics associated with the beverage forming ingredient may be utilized as desired in accordance with embodiment of the invention including, but not limited to, one or more parameters associated with a pumping performance of the beverage forming ingredient, one or more parameters associated with fluid characteristics of the beverage forming ingredient, and/or one or more parameters associated with a flow rate or a flow rate range for the beverage forming ingredient and/or the pumping technology. An example of a parameter associated with a pumping performance is a viscosity of the beverage forming ingredient. Another example of parameters associated with pumping performance are parameters associated with the functionality, characteristics, and/or the capabilities of the pumping technology associated with the beverage forming ingredient. Examples of parameters associated with a flow rate or a flow rate range may include a target flow rate for the beverage forming ingredient and/or the pumping technology and one or more threshold values for the flow rate. For example, an acceptable flow rate range may be established for the beverage forming ingredient and/or the pumping technology. The characteristics stored by the control node 305 may be prestored, may be received from another component of the beverage forming dispenser 105, such as, a central controller or a RFID reader/writer, and/or may be received from an external component.

Additionally, the control node 305 may configure the dispense of the beverage forming ingredient based at least in part on the pumping technology associated with the beverage forming ingredient. The type of pumping technology and/or the quantity of pumps associated with the pumping technology may be taken into account. For example, if multiple pumps are associated with a beverage forming ingredient, the dispense may be configured differently than if only a single pump were utilized. If for example, four pumps are associated with a beverage forming ingredient, then each of the four pumps may be configured to pump approximately one-fourth of the amount or volume of a beverage forming ingredient that a single pump may be configured to pump if only a single pump is associated with the beverage forming ingredient.

In one embodiment of the invention, configuring the dispense of the beverage forming ingredient may include determining and configuring an expected flow rate for the beverage forming ingredient. The expected flow rate for the beverage forming ingredient may be determined based at least in part on the one or more received dispense parameters or, alternatively, the expected flow rate for the beverage forming ingredient may be received in conjunction with the one or more dispense parameters. The expected flow rate for the beverage forming ingredient may be determined based at least in part on the flow rate for the selected beverage and the dispense ratio for the beverage forming ingredient. For example, if the flow rate for the selected beverage is approximately three (3) ounces per second and the dispense ratio for the beverage forming ingredient is approximately one-eleventh ($1/11$), then the expected flow rate for the beverage forming ingredient may be determined to be approximately 3 times ($1/11$) ounces per second, or approximately 0.27 ounces per second.

The expected flow rate for the beverage forming ingredient may be utilized in a configuration of the pumping technology associated with the beverage forming ingredient. For example, if four pumps are associated with a beverage forming ingredient, then each of the four pumps may be configured to pump approximately 0.0675 ounces per second (or approximately 0.27 ounces per second divided by four).

Following the configuration of the dispense of the beverage forming ingredient, operations may move to block 615.

In block 615, the control node 305 may receive a command to commence a dispense of the beverage forming ingredient. Following the receipt of the command to commence a dispense of the beverage forming ingredient, operations may move to block 620.

In block 620, the control node 305 may commence pumping of the beverage forming ingredient by directing pumping technology associated with the beverage forming ingredient, such as pumping technology 325A, to commence pumping the beverage forming ingredient. The pumping of the beverage forming ingredient may be configured based at least in part on the dispense configuration of the beverage forming ingredient. Once the pumping of the beverage forming ingredient is commenced, operations may move to block 625.

In block 625, the control node 305 may monitor the pumping of the beverage forming ingredient. Suitable measurement technology, such as measurement technology 330A, may be utilized in association with the control node 305 in order to monitor the beverage forming ingredients.

Based at least in part on the monitoring of the pumping beverage forming ingredient, one or more determinations may be made as to whether the beverage forming ingredient is being dispensed properly and/or whether the beverage forming ingredient is being dispensed at a desired rate. If it is determined that the beverage forming ingredient is not dispensing properly and/or is not being dispensed at a desired rate, the pumping of the beverage forming ingredient may be adjusted as desired in an embodiment.

The monitoring and optional adjusting of the dispense of the beverage forming ingredient may be continued until a command is received to cease the dispense of the beverage forming ingredient. Following the monitoring of a beverage forming ingredient in block 625, processing may move to block 630.

In block 630, a determination may be made as to whether a command to cease the dispense of a beverage forming ingredient has been received. If a command to cease the dispense of a beverage forming ingredient has not been received, then operations may move to block 625 and the monitoring of the beverage forming ingredient may continue. If, however, a command to cease the dispense of a beverage forming ingredient has been received, then operations may end.

Various embodiments of the invention may control the dispense of a beverage forming ingredient in many different ways as may be desired in certain embodiments. For example, as an alternative to dispensing a beverage forming ingredient until a cease dispense command is received, a cup size selection may be utilized to determine an amount or volume of a beverage forming ingredient to include in a selected beverage. The determined amount or volume of the beverage forming ingredient may then be precisely dispensed. The use of a flow rate in an embodiment of the invention may provide for the dispense of a beverage forming ingredient that is independent of a cup size selection and may be desirable in certain situations, for example, when the dispense of a selected beverage is controlled manually by a customer.

The example of a method for controlling the dispense of a beverage forming ingredient by an associated control node may end once a command to cease the dispense of a beverage forming ingredient is received.

Figure 7:
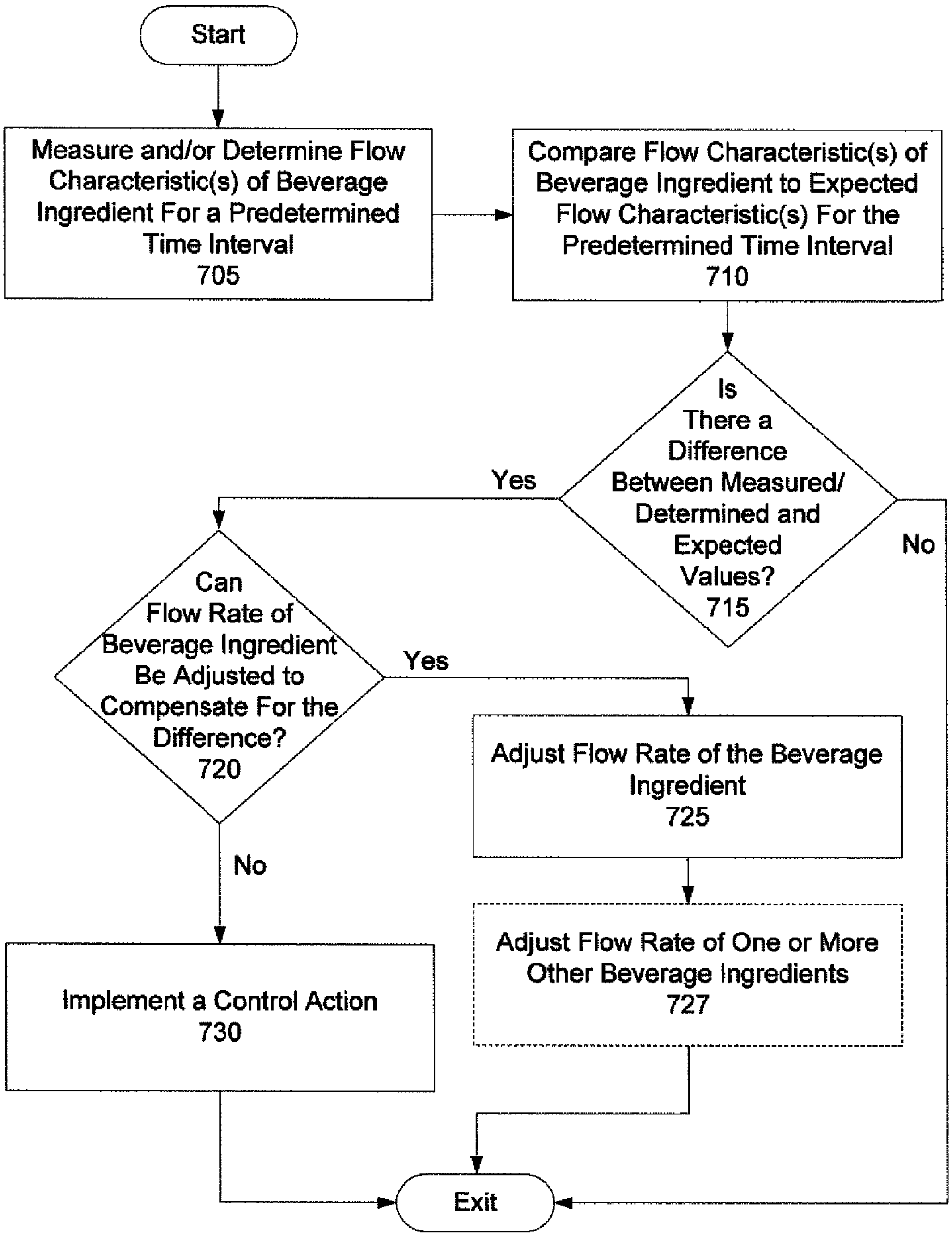
FIG. 7 illustrates one example of a method for monitoring the dispense of a beverage forming ingredient in accordance with an embodiment of the invention.

FIG. 7 illustrates one example of a method for monitoring the dispense of a beverage forming ingredient in accordance with an embodiment of the invention. The monitoring may be performed by a control node associated with the beverage forming ingredient, such as node 305, and/or by a central controller, such as controller 105. Operations may commence in block 705.

In block 705, one or more flow characteristic of a beverage forming ingredient that is being pumped may be measured and/or determined. For example, a flow rate of the beverage forming ingredient that is being pumped may be measured and/or determined utilizing suitable measurement technology, such as measurement technology 330A, and associated control logic. As another example, an amount or volume of a beverage forming ingredient that is being pumped may be measured and/or determined utilizing suitable measurement technology, such as measurement technology 330A, and associated control logic.

According to one embodiment of the invention, one or more flow characteristics of a beverage forming ingredient that is being pumped may be measured and/or determined for a predetermined time interval or a predetermined period of time. Many different predetermined time intervals may be utilized in accordance with embodiments of the invention, such as, a predetermined time interval of approximately 50 milliseconds (ms). For example, the flow rate of the beverage forming ingredient and/or the amount or volume of beverage forming ingredient that is pumped may be determined for the predetermined period of time. Once the one or more flow characteristics of a beverage forming ingredient are measured and/or determined, then processing may move to block 710.

In block 710, one or more of the measured and/or determined flow characteristics may be compared to one or more respective expected flow characteristics. For example, a measured or determined flow rate of the beverage forming ingredient may be compared to an expected flow rate of the beverage forming ingredient. As another example, a measured or determined volume or amount of pumped beverage forming ingredient may be compared to an expected volume or amount of pumped beverage forming ingredient.

According to an embodiment of the invention, one or more of the measured and/or determined flow characteristics for a predetermined time interval may be compared to respective expected flow characteristics for the predetermined time interval. For example, a measured or determined flow rate for the preceding 50 ms may be compared to an expected flow rate for the preceding 50 ms for the beverage forming ingredient. As another example, a measured or determined volume or amount of pumped beverage forming ingredient for the preceding 50 ms may be compared to an expected volume or amount of pumped beverage forming ingredient for the preceding 50 ms. In certain embodiments of the invention, each of the expected flow characteristics may be constant throughout the dispense of the beverage forming ingredient for the selected beverage; however, it will be understood that at least a portion of the expected flow characteristics may be dynamically changed or updated during the dispense of the beverage forming ingredient based at least in part on the measured and/or determined flow characteristics. Once one or more of the measured and/or determined flow characteristics are compared to respective expected flow characteristics, operations may move to block 715

In block 715, a determination may be made as to whether there is a difference between one or more of the measured and/or determined flow characteristics and respective expected flow characteristics. In certain embodiments, a tolerance and/or error factor may be incorporated into the determination of whether there is a difference as desired in embodiments of the invention.

As an example of determining whether there is a difference between a measured flow characteristic and an expected flow characteristic, a measured flow rate of a beverage forming ingredient for a predetermined time interval may he compared to an expected flow rate or target flow rate of the beverage forming ingredient for the predetermined time interval. For this example, it will be assumed that the measured flow rate of the beverage forming ingredient for the preceding 50 ms is approximately 0.8 ounces per second and the expected flow rate of the beverage forming ingredient for the preceding 50 ms is approximately one (1) ounce per second. Also, for this example, a tolerance of plus or minus ten percent may be included in the determination of whether there is a difference. In this example, it may be determined that there is a difference between the measured flow rate and the expected flow rate of the beverage forming ingredient. If the parameters set forth above are utilized, except the measured flow rate is approximately 0.95 ounces per second for the preceding 50 ms, then it may be determined that there is no difference between the measured flow rate and the expected flow rate.

As another example of determining whether there is a difference between a measured flow characteristic and an expected flow characteristic, a measured amount or volume of a beverage forming ingredient that is pumped in a predetermined time interval may be compared to an expected amount or volume or target amount or volume to be pumped in the predetermined time interval. For this example, it will be assumed that the measured volume of the beverage forming ingredient for the preceding 50 ms is approximately 40 microliters (mL) and the expected volume of the beverage forming ingredient for the preceding 50 ms is approximately 50 mL (mL). Also, for this example, a tolerance of plus or minus ten percent may be included in the determination of whether there is a difference. In this example, it may be determined that there is a difference between the measured volume and the expected volume of the beverage forming ingredient. If the parameters set forth above are utilized, except the measured volume is approximately 49 microliters (mL) for the preceding 50 ms, then it may be determined that there is no difference between the measured volume and the expected volume.

If it is determined that there is no difference between a measured or determined flow characteristic and an expected flow characteristic during the predetermined time interval, then operations may stop. One or more flow characteristics may be measured and compared to respective expected flow characteristics in one or more subsequent predetermined time intervals during the dispense of the beverage forming ingredient. In this regard, the monitoring of the beverage forming ingredient may continue during one or more subsequent predetermined time intervals and the beverage forming ingredient may be monitored during the course of its pumping and dispense.

If, however, it is determined that there is a difference between a measured or determined flow characteristic and an expected flow characteristic during the predetermined time interval, then processing may move to block 720.

In block 720, a determination may be made as to whether the flow rate of the beverage forming ingredient may be adjusted to compensate for the determined difference. In other words, a determination may be made as to whether the flow rate of the beverage forming ingredient may be increased or decreased in order to compensate for the determined difference. For example, if a measured flow rate for the beverage forming ingredient for the predetermined time interval is approximately 0.8 ounces per second and the expected flow rate for the beverage forming ingredient is approximately one (1) ounce per second, then a determination may be made as to whether the flow rate of the beverage forming ingredient may be adjusted to compensate for the determined difference. The adjustment of the flow rate may be limited by one or more threshold values associated with the flow rate and/or the pumping of the beverage forming ingredient. For example, a maximum flow rate or pumping rate may be associated with the beverage forming ingredient. If the flow rate cannot be adjusted to satisfy the one or more threshold values, then it may be determined that the flow rate cannot be adjusted to compensate for the determined difference. For example, if the measured flow rate is greater than the maximum flow rate and the flow rate cannot be adjusted to be less than the maximum flow rate, such as in a situation in which a valve or pump has malfunctioned, then it may be determined that the flow rate cannot be properly adjusted. As another example, if the measured flow rate is less than the expected flow rate and the flow rate would have to be adjusted to a value that is greater than the maximum flow rate in order to compensate for the difference, then it may be determined that the flow rate cannot be properly adjusted. Such a situation may occur, for example, when a beverage forming ingredient package, such as 114, from which the beverage forming ingredient is supplied is empty or essentially empty. Such a situation may also occur if at least a portion of the pumping technology is not operating properly.

If it is determined that the flow rate of the beverage forming ingredient may be adjusted to compensate for the difference in the measured flow rate and the expected flow rate, then processing may move to block 725. However, if it is determined that the flow rate of the beverage forming ingredient may not be adjusted to compensate for the difference in the measured flow rate and the expected flow rate, then processing may move to block 730.

In block 725, the flow rate of the beverage forming ingredient may be adjusted in order to compensate for the difference between the measured flow rate and the expected flow rate. In this regard, the flow rate may be increased or decreased in order to compensate for the difference.

For example, if the measured flow rate of the beverage forming ingredient is approximately 0.8 ounces per second and the expected flow rate is approximately one (1) ounce per second, then the flow rate of the beverage forming ingredient may be increased to compensate for the deficient dispense of the beverage forming ingredient during the predetermined time interval. The adjustment to the flow rate may result in the flow rate being a flow rate that is different from the expected flow rate. Using the current example, the flow rate of the beverage forming ingredient may be increased to approximately 1.2 ounces per second in order to compensate for the deficient dispense of the beverage forming ingredient during the predetermined time interval. Accordingly, during the next predetermined time interval, the flow rate of the beverage forming ingredient to be dispensed may be approximately equal to the expected flow rate plus the flow rate to compensate for the past deficiency. In certain embodiments of the invention, the expected flow rate may also be adjusted or updated as desired.

In one embodiment of the invention, the flow rate of the beverage forming ingredient may continually be adjusted in order to pump and dispense a precise amount of the beverage forming ingredient for the selected beverage. Additionally, information associated with one or more previous adjustments that have been made to the flow rate may be stored in an appropriate memory, and the information associated with the previous adjustments may be utilized in determining whether an adjustment should be made to the flow rate. Using the example above, if the flow rate for one predetermined time interval has been adjusted to approximately 1.2 ounces per second and the expected flow rate for the predetermined time interval and the next predetermined time period is approximately one (1) ounce per second, then it may be determined that the flow rate for the one predetermined time interval is greater than the expected flow rate for the time interval (1.2-1). Accordingly, the flow rate may be adjusted to compensate for the difference. However, the information associated with the previous adjustment may be utilized to determine that amount of the adjustment, if any, that will be made. In this example, because the adjustment to a flow rate of approximately 1.2 ounces per second was made to compensate for a previous flow rate of approximately 0.8 ounces per second, it may be determined that the flow rate should only be adjusted to approximately 1.0 ounces per second for the next predetermined time interval. If no information associated with previous adjustment is utilized, then the flow rate may be adjusted to approximately 0.8 ounces per second moving forward.

Although the adjustments to the flow rate in block 725 are described with reference to measured flow rates, in certain embodiments, the adjustments to the flow rate may be determined based on a comparison of a measured volume of dispensed beverage forming ingredient to an expected volume of dispensed beverage forming ingredient.

One or more components that monitor the dispense and/or pumping of a beverage forming ingredient, such as, a control node 305 and/or a central controller 105, may be responsible for pumping and/or dispensing the beverage forming ingredient within acceptable parameters for pumping and/or dispense. For example, the beverage forming ingredient may be monitored in order to determine whether the beverage forming ingredient is being pumped and/or dispensed within an acceptable range for pumping or dispense. In the event that a beverage forming ingredient cannot be pumped or dispensed within an acceptable range, then the flow rate of the beverage forming ingredient and/or the flow rates of one or more other beverage forming ingredients for the selected beverage may be adjusted as desired. For example, if a beverage forming ingredient is unable to be pumped at a target or expected flow rate during a predetermined time interval, then the flow rate of the beverage forming ingredient and/or the flow rates of the other beverage forming ingredients for the selected beverage may be adjusted. As an example, if the beverage forming ingredient is being pumped at a flow rate that is lower than an expected flow rate and the flow rate of the beverage forming ingredient cannot be adjusted, then the flow rates of the other beverage forming ingredients for the selected beverage may be decreased in order to accurately pump and dispense the selected beverage. The optional adjustment of one or more other beverage forming ingredients is illustrated in optional block 727.

According to one embodiment of the invention, the adjustment of the flow rate of one or more beverage forming ingredients may be based at least in part on a total accumulated dispense volume for a selected beverage that is being pumped and/or dispensed. For example, after a predetermined period of time, such as 50 ms, a total accumulated dispense volume for a selected beverage may be determined. The total accumulated dispense volume may be determined based at least in part on the total amount or volume that is dispensed for the selected beverage for each of the ingredients of the selected beverage. The total accumulated dispense volume may be utilized to adjust the flow rates of one or more of the beverage forming ingredients for the selected beverage. The determination of the total accumulated dispense volume may be made by a central controller, such as controller 105, and communicated to the control nodes associated with the beverage forming ingredients of the selected beverage, such as nodes 305A-N. The total accumulated dispense volume may then be utilized to adjust the flow rate at which the beverage forming ingredient is pumped and/or dispensed. For example, if a beverage forming ingredient is not being pumped at a desired flow rate, then the determined total accumulated dispense volume may reflect the disparate flow rate. The determined total accumulated dispense volume may then be utilized by an appropriate control device, such as controller 105 or control nodes 305A-N, to adjust the flow rates of one or more other beverage forming ingredients of the selected beverage. For example, if during the dispense of a selected beverage, approximately 0.2 ounces of the selected beverage should have been dispensed at a given point of time but only 0.15 ounces of the selected beverage has been dispensed at the given point of time because one of the beverage forming ingredients is not being dispensed properly, then the flow rates of the other beverage forming ingredients may be adjusted. For each of the other beverage forming ingredients, a determination may be made that a greater amount of the beverage forming ingredient has been pumped and/or dispensed than that specified in the recipe for the selected beverage, and the pumping of the beverage forming ingredient may be dynamically adjusted in accordance with the determination.

The total accumulated dispense volume may then be updated periodically during the dispense of the selected beverage as desired. For example, the total accumulated dispense volume may be updated every 50 ms.

According to another embodiment of the invention, the adjustment of the flow rate of one or more beverage forming ingredients may be based at least in part on an adjustment to the flow rate of the selected beverage. For example, if a beverage forming ingredient cannot be pumped and/or dispensed at an expected flow rate, then the flow rate of the selected beverage may be adjusted. The adjustment to the flow rate of the selected beverage may take the actual flow rate of the beverage forming ingredient that cannot be pumped and/or dispensed at an expected flow rate into account. For example, if the expected flow rate of the beverage forming ingredient is approximately 0.5 ounces per second but the beverage forming ingredient can only be pumped and/or dispensed at a flow rate of approximately 0.3 ounces per second, then the flow rate of the selected beverage may be adjusted based at least in part on the actual flow rate of approximately 0.3 ounces per second for the beverage forming ingredient. The flow rate of the selected beverage may be adjusted so that the other beverage forming ingredients are pumped and/or dispensed in accordance with the recipe for the selected beverage. In the example above, the flow rate of the selected beverage may be reduced to account for the actual flow rate of approximately 0.3 ounces per second for the one beverage forming ingredient, and the flow rates of the other beverage forming ingredients of the selected beverage may be reduced in accordance with the recipe for the selected beverage.

In block 730, one or more control actions may be implemented if the flow rate of the beverage forming ingredient may not be adjusted to compensate for the determined difference between a measured or determined flow characteristic and an expected flow characteristic. A wide variety of control actions may be taken as desired in embodiments of the invention. Examples of control actions that may be taken include, but are not limited to, ceasing the dispense of a beverage forming ingredient, limiting the dispense of a beverage forming ingredient, dispensing a beverage at a reduced speed or flow rate, outputting an appropriate error message, communicating an appropriate error message over a network, and/or switching to a second beverage forming ingredient package, such as 114, or beverage forming ingredient source to complete the dispense of the beverage forming ingredient.

One possible control action is ceasing the dispense of the beverage forming ingredient. If the beverage forming ingredient is not being dispensed properly, then a low quality beverage may be dispensed by a beverage forming dispenser 100. For example, a COCA-COLA™ beverage may be dispensed that does not have an appropriate amount of COCA-COLA™ syrup, leading to a beverage that is either too strong or too weak. Such a dispense may lead to customer dissatisfaction. Additionally, if continued dispense of the COCA-COLA™ beverage is allowed, then multiple beverages may be dispensed that lead to customer dissatisfaction. By ceasing the dispense of the beverage forming ingredient, then the dispense of an inadequate COCA-COLA™ beverage may be limited or prevented, thereby limited and/or limiting customer dissatisfaction. Additionally, by ceasing the dispense of the beverage forming ingredient, a customer may be notified of the inadequate dispense of the selected beverage and the inadequate dispense may be rectified. For example, one or more new beverage forming ingredient package, such as 114, may be inserted into the ingredient matrix, allowing the COCA-COLA™ beverage to be dispensed properly. As another example, the beverage forming dispenser 100 or components of the beverage forming dispenser 100 may be reset or default values may be restored by a customer or a technician. As another example, a service technician may be notified by the customer as a result of the control action.

In one embodiment of the invention, one or more tolerance settings may be utilized in conjunction with implementing a control action. In the example of a control action in which the dispense of a beverage forming ingredient is ceased, one or more tolerance settings may permit the dispense of the selected beverage to be completed prior to limiting the dispense of a beverage forming ingredient. For example, if the dispense of the selected beverage is approximately equal to or greater than a threshold completion value, such as 90 percent, then the dispense of the selected beverage may be allowed to be completed. Following the completion of the dispense, further dispenses of the beverage forming ingredient may be limited, prevented, or ceased.

Another possible control action is limiting the dispense of the beverage forming ingredient. For example, the dispense of the beverage forming ingredient may be prevented from an ingredient matrix location or beverage forming ingredient package associated with the control action.

Another possible control action is to dispense the beverage forming ingredient by utilizing another source of the beverage forming ingredient if another source is available. For example, the dispense of the beverage forming ingredient may be implemented by utilizing a second beverage forming ingredient package containing the beverage forming ingredient that is connected to or associated with an ingredient matrix, such as 112.

Another possible control action is to dispense the beverage at a reduced speed or flow rate. For example, if a beverage forming ingredient is not capable of being dispensed at a desired flow rate, a determination may be made as to a flow rate at which the beverage forming ingredient may be dispensed. The dispense of the beverage may then be implemented at a reduced flow rate based at least in part on the determination. Alternatively, a determination may be made as to whether the beverage forming ingredient may be dispensed in accordance with a predetermined minimum flow rate. If it is determined that the beverage forming ingredient may be dispensed in accordance with the predetermined minimum flow rate, then the dispense of the beverage may be implemented utilizing the predetermined minimum flow rate.

Another possible control action is to output and/or communicate an appropriate error message associated with the determination that the flow rate of the beverage forming ingredient cannot be adjusted. For example, an error message or error indication may be output utilizing one or more appropriate output devices associated with a controller, such as 105, or a control node, such as 305. Many different types of error messages or indications may be utilized as desired in embodiments of the invention such as, text messages that are output utilizing a suitable display and/or LED indicators.

One or more error messages may also be communicated in association with the determination that the flow rate of the beverage forming ingredient cannot be adjusted. The one or more error messages may be communicated via an appropriate network. The one or more error messages may be communicated to other components of the beverage forming dispenser 100 and/or to remote devices. For example, a control node, such as 305 may communicate an error message to a central controller, such as 105. As another example, a control node 305 and/or a central controller 105 may communicate an error messages to a remote device, such as, a server, processing center, customer support center, technical support center and/or a personal computer associated with a maintenance supervisor, a customer, a supervisor of the customer, or a technician associated with the beverage forming dispenser 100. The error messages may be communicated in any suitable form, for example, by e-mail over a LAN or WAN (e.g., the Internet).

The example of a method for monitoring the dispense of a beverage forming ingredient may end following either block 715 or block 730.

Additionally, at least one program storage device readable by a machine, tangibly embodying at least one program or set of instructions executable by the machine to perform the capabilities of the embodiment of the invention can be provided.

The flow diagrams depicted herein are examples. There may be many variations to these diagrams or the steps (or operations) described therein without departing from the scope of the invention. For instance, the steps may be performed in a differing order, or steps may be added, deleted or modified. All of these variations are considered a part of the claimed invention.

While embodiments of the invention have been described, it will be understood that those skilled in the art, both now and in the future, may make various improvements and enhancements which fall within the scope of the claims which follow. These claims should be construed to maintain the proper protection for the invention first described.

The claimed invention is:

1. A method for dispensing a product, the method comprising:

associating a plurality of product ingredients with a product dispenser, wherein a plurality of selectable products may be formed from the plurality of product ingredients;

receiving input comprising a selected product for dispense;

identifying a recipe for the selected product, wherein the recipe defines a ratio of the plurality of product ingredients for forming the selected product;

identifying, based at least in part on the recipe, a respective expected flow rate for each of the plurality of product ingredients;

commencing a dispense of each of the respective plurality of product ingredients based at least in part on the identified recipe;

independently monitoring, during the dispense, a respective actual flow rate for each of the plurality of product ingredients;

determining a difference between the monitored flow rate for at least one of the plurality of product ingredients and the expected flow rate for the at least one of the plurality of product ingredients;

determining a total accumulated volume of the selected product that has been dispensed during the dispense; and adjusting, based at least in part upon the determined difference and the total accumulated volume, the flow of the at least one of the plurality of product ingredients to achieve a flow rate other than the expected flow rate for the at least one of the plurality of product ingredients and the monitored flow rate for the at least one of the plurality of product ingredients.

2. The method of claim 1, further comprising receiving input for a cup size associated with the selected product, and wherein commencing a dispense of each of the respective plurality of product ingredients is further based at least in part on the received input for the cup size.

3. The method of claim 1, wherein monitoring a respective actual flow rate associated with each of the plurality of product ingredients comprises monitoring a respective actual flow rate for a predetermined period of time, and wherein determining a difference between a monitored flow rate for the at least one of the plurality of product ingredients and an expected flow rate for the at least one of the plurality of product ingredients comprises determining a difference between the monitored flow rate for the predetermined period of time and an expected flow rate for the predetermined period of time.

4. The method of claim 1, further comprising:

determining, based at least in part on monitoring the dispense of the plurality of product ingredients, that one of the plurality of product ingredients is not being dispensed properly.

5. The method of claim 4, wherein determining that one of the plurality of product ingredients is not being dispensed properly is based at least in part on a comparison of the monitored actual flow rate associated with the at least one of the plurality of product ingredients to at least one threshold flow rate value associated with the at least one of the plurality of product ingredients.

6. The method of claim 4, further comprising:

implementing a control action based at least in part on determining that one of the plurality of product ingredients is not being dispensed properly.

7. The method of claim 6, wherein implementing a control action comprises at least one of limiting the dispense of the at least one of the plurality of product ingredients, ceasing the dispense of the at least one of the plurality of product ingredients, outputting an error message, or communicating an error message to a remote device via a network.

8. The method of claim 1, further comprising:

identifying one or more previous adjustments to the flow of the associated product ingredient, wherein adjusting the flow of the associated product ingredient comprises adjusting the flow based at least in part on the one or more previous adjustments.

9. The method of claim 1, wherein determining a total accumulated volume of the selected product that has been dispensed comprises determining a total accumulated volume that has been dispensed during a continuous dispense of the selected product, and wherein adjusting the flow of the associated product ingredient comprises adjusting the flow during the continuous dispense.

10. The method of claim 1, wherein independently monitoring an actual flow rate for each of the at least some of the plurality of product ingredients comprises independently monitoring an actual flow rate for at least three product ingredients defined by the recipe.

11. A method for dispensing a product ingredient, the method comprising:

receiving input comprising a selection of a product for dispense, wherein the product ingredient is a component of the selected product;

identifying a recipe for the selected product, wherein the recipe defines a ratio of the product ingredient relative to one or more other product ingredients forming the selected product;

identifying, based at least in part on the recipe, an expected flow rate for the product ingredient;

commencing a dispense of the product ingredient based at least in part on the identified recipe; and monitoring, during the dispense of the product ingredient, an actual flow rate for the product ingredient;

determining a difference between the monitored flow rate for the product ingredient and the expected flow rate for the product ingredient;

determining a total accumulated volume of the selected product that has been dispensed during the dispense; and adjusting, based at least in part upon the determined difference and the total accumulated volume, the flow of the product ingredient to achieve a flow rate other than the expected flow rate for the product ingredient and the monitored flow rate for the product ingredient.

12. The method of claim 11, wherein receiving input further comprises receiving a cup size indication for the dispense, and wherein commencing a dispense of the product ingredient further comprises commencing a dispense of the product ingredient based at least in part on the received cup size indication.

13. The method of claim 11, wherein the monitoring an actual flow rate associated with the product ingredient comprises determining an actual flow rate for the product ingredient for a predetermined period of time, and wherein determining a difference between the monitored flow rate for the product ingredient and the expected flow rate for the product ingredient comprises determining a difference between the monitored flow rate for the product ingredient for the predetermined period of time and an expected flow rate for the product ingredient for the predetermined period of time.

14. The method of claim 11, wherein monitoring an actual flow rate of the product ingredient comprises determining an amount of the product ingredient that is dispensed in a predetermined period of time, and wherein determining a difference between the monitored flow rate for the product ingredient and the expected flow rate for the product ingredient comprises determining a difference between the determined amount of the product ingredient and an expected amount for the product ingredient for the predetermined period of time.

15. The method of claim 11, further comprising:
determining, based at least in part on monitoring the dispense of the product ingredient, that the product ingredient is not being dispensed properly.

16. The method of claim 11, wherein determining that the product ingredient is not being dispensed properly is based at least in part on a comparison of the monitored actual flow rate associated with the product ingredient to at least one threshold flow rate value associated with the product ingredient.

17. The method of claim 15, further comprising:
implementing a control action based at least in part on determining that the product ingredient is not being dispensed properly.

18. The method of claim 17, wherein implementing a control action comprises at least one of limiting the dispenses of the product ingredient, ceasing the dispense of the product ingredient, displaying an error message associated with the dispense of the product ingredient, or communicating an error message associated with the dispense of the product ingredient to a remote device via a network.

19. A dispenser apparatus, comprising:
an ingredient matrix operable to receive a plurality of product ingredients within respective locations, wherein a plurality of selectable products may be formed from at least some of the plurality of product ingredients;
an input device operable to receive a product selection; and
a controller to execute a set of instructions operable to:
receive the product selection;
identify a recipe for the selected product, wherein the recipe defines a ratio of at least some of the plurality of product ingredients to form the selected product;
identify, based at least in part on the recipe, a respective expected flow rate for each of the at least some of the plurality of product ingredients;
direct a dispense of each of the respective at least some of the plurality of product ingredients based at least in part on the identified recipe;
independently monitor, during the dispense, a respective actual flow rate of each of the at least some of the plurality of product ingredients;
determine a difference between the monitored flow rate for at least one of the plurality of product ingredients and the expected flow rate for the at least one of the plurality of product ingredients;
determine a total accumulated volume of the selected product that has been dispensed; and
adjust, based at least in part upon the determined difference and the total accumulated volume, the flow of the at least one of the plurality of product ingredients to achieve a flow rate other than the expected flow rate of the at least one of the plurality of product ingredients and the monitored flow rate of the at least one of the plurality of product ingredients.

20. A dispenser apparatus, comprising:
an ingredient matrix operable to receive a plurality of product ingredients within respective locations, wherein a plurality of selectable products may be formed from at least some of the plurality of product ingredients;
an input device operable to receive a product selection;
a controller to execute a set of instructions operable to:
receive the product selection;
identify a recipe for the selected product, wherein the recipe defines a ratio of the at least some of the plurality of product ingredients to form the selected product; and
direct a dispense of each of the respective at least some of the plurality of product ingredients based at least in part on the identified recipe; and
one or more control nodes associated with each of the at least some of the plurality of product ingredients, wherein at least one of the one or more control nodes executes a set of instructions operable to:
receive, from the controller, a dispense direction and at least one associated expected flow rate that is based at least in part on the identified recipe;
commence the dispense of an associated product ingredient based at least in part on the at least one associated expected flow rate;
monitor, during the dispense, an actual flow rate of the associated product ingredient;
determine a difference between the monitored flow rate and the expected flow rate; and
adjust, based at least in part upon the determined difference and a total accumulated volume of the selected product that has been dispensed during the dispense, the flow of the associated product ingredient to achieve a flow rate other than the expected flow rate and the monitored flow rate.

21. The dispenser apparatus of claim 20, wherein the input device is further operable to receive input for a cup size associated with the selected product, and
wherein the controller is further operable to direct the dispense of each of the respective at least some of plurality of product ingredients based at least in part on the received input for the cup size.

22. The dispenser apparatus of claim 20, wherein the expected flow rate comprises an expected flow rate for a predetermined period of time, and
wherein the monitored actual flow rate comprises an actual flow rate for the predetermined period of time.

23. The dispenser apparatus of claim 22, wherein the at least one control node is further operable to:
determine, based at least in part on comparing the monitored flow rate associated with the monitored product ingredient to a least one threshold flow rate value associated with the associated product ingredient, that the product ingredient is not being dispensed properly; and
implement a control action based at least in part on the determination that the associated product ingredient is not being dispensed properly.

24. The dispenser apparatus of claim 23, wherein the control action comprises at least one of limiting the dispense of the associated product ingredient, ceasing the dispense of the associated product ingredient, directing the output of an error indication, or directing, via a network, the communication of an error message to the controller or to a remote device.

* * * * *